United States Patent
Searles et al.

(10) Patent No.: US 7,765,425 B1
(45) Date of Patent: Jul. 27, 2010

(54) INCREMENTALLY ADJUSTABLE SKEW AND DUTY CYCLE CORRECTION FOR CLOCK SIGNALS WITHIN A CLOCK DISTRIBUTION NETWORK

(75) Inventors: Shawn Searles, Austin, TX (US); Donald Walters, Austin, TX (US); Ravinder Rachala, Austin, TX (US); Scott C. Johnson, Round Rock, TX (US)

(73) Assignee: GlobalFoundries, Inc., Grand Cayman (KY)

( * ) Notice: Subject to any disclaimer, the term of this patent is extended or adjusted under 35 U.S.C. 154(b) by 990 days.

(21) Appl. No.: 11/385,329

(22) Filed: Mar. 21, 2006

(51) Int. Cl.
*G06F 1/04* (2006.01)

(52) U.S. Cl. ...................... 713/503; 713/401
(58) Field of Classification Search ............... 713/401, 713/503; 716/6
See application file for complete search history.

(56) References Cited

U.S. PATENT DOCUMENTS

| | | | | |
|---|---|---|---|---|
| 5,268,656 A * | 12/1993 | Muscavage | ................ | 331/45 |
| 5,414,381 A * | 5/1995 | Nelson et al. | ................ | 327/262 |
| 5,465,347 A * | 11/1995 | Chao et al. | ................ | 713/401 |
| 5,550,499 A | 8/1996 | Eitrheim | | |
| 5,757,218 A | 5/1998 | Blum | | |
| 5,949,262 A * | 9/1999 | Dreps et al. | ................ | 327/156 |
| 6,053,950 A * | 4/2000 | Shinagawa | ................ | 716/2 |
| 6,285,226 B1 | 9/2001 | Nguyen | | |
| 6,487,697 B1 * | 11/2002 | Lu et al. | ................ | 716/2 |
| 6,550,045 B1 * | 4/2003 | Lu et al. | ................ | 716/6 |
| 6,630,855 B2 * | 10/2003 | Fayneh et al. | ................ | 327/295 |
| 6,704,881 B1 * | 3/2004 | Li et al. | ................ | 713/401 |
| 6,768,697 B2 | 7/2004 | Labrum et al. | | |
| 6,859,080 B2 * | 2/2005 | Peng | ................ | 327/163 |
| 7,017,132 B2 * | 3/2006 | Hou et al. | ................ | 716/6 |
| 7,243,324 B2 * | 7/2007 | Lu et al. | ................ | 716/6 |
| 7,257,788 B2 * | 8/2007 | Haar et al. | ................ | 716/6 |
| 7,332,950 B2 * | 2/2008 | Blodgett | ................ | 327/269 |
| 7,421,606 B2 * | 9/2008 | Kim | ................ | 713/401 |
| 2003/0208717 A1 | 11/2003 | Kolotchkov et al. | | |
| 2004/0161068 A1 | 8/2004 | Zerbe et al. | | |
| 2004/0189364 A1 | 9/2004 | Lee et al. | | |
| 2005/0001655 A1 | 1/2005 | Takeda | | |
| 2005/0007168 A1 | 1/2005 | Park et al. | | |
| 2005/0184779 A1 | 8/2005 | Yoo et al. | | |
| 2005/0237086 A1 | 10/2005 | Galloway et al. | | |
| 2005/0253637 A1 | 11/2005 | Mahadevan et al. | | |
| 2006/0028256 A1 | 2/2006 | Nam et al. | | |

OTHER PUBLICATIONS

"Self-Checking Scheme for Very Fast Clock's Shew Correction"; Cecilia metra, Flavio Giovanelli, Mani Soma and Bruno Ricco; Downloaded from IEE. org. pp. 652-661.

* cited by examiner

*Primary Examiner*—Chun Cao
(74) *Attorney, Agent, or Firm*—Robert C. Kowert; Meyertons, Hood, Kivlin, Kowert & Goetzel, P.C.

(57) ABSTRACT

A system and method for using variable delay adjusters located at various points across an integrated circuit to measure clock skew and jitter for clock signals of the integrated circuit. A delay controller of the integrated circuit may measure and compensate for clock skew detected between two clock signals by configuring variable delay adjusters located inline with the respective clock signals. Such a delay controller may also use the variable delay adjusters to correct duty cycle errors in a clock signal and may further utilize the variable delay adjusters to measure and characterize jitter detected on the clock signals.

17 Claims, 12 Drawing Sheets

INCREMENTALLY ADJUSTABLE SKEW AND DUTY CYCLE CORRECTION FOR CLOCK SIGNALS WITHIN A CLOCK DISTRIBUTION NETWORK

BACKGROUND OF THE INVENTION

1. Field of the Invention

This invention is related to the field of integrated circuits, and more particularly, to methods and systems for measuring and adjusting various characteristic of clock signals, such as clock skew, duty cycle and jitter.

2. Description of the Related Art

Typically, complex logic core designs rely on one or more clocks for operational synchronization. Some of the desirable qualities for a clock signal may be an extremely small period, very short rise and/or fall times, low jitter, available everywhere on the chip with very low skew, and the ability to drive heavy loads at any point on the chip, while consuming the least possible amount of power.

Clock skew may be defined as the difference in time between simultaneous clock transitions within a system. Skew has become the major part of constraints that form the upper boundary for the system clock frequency. Clock skew refers to a phenomenon in which a clock signal arrives at different components at different times. The difference in arrival time may be caused by the clock signal traveling different distances to different components or may also be caused by defect or flow in materials or manufacturing causing the clock signal to travel faster or slower along a pathway than expected.

Reduction in system clock skew may also reduce costs by avoiding complicated architecture or faster logic. To ensure that a clocking network operates as closely to the ideal as possible, skew may be minimized along the entire clocking network. This ensures that all sequential elements see a common clock edge. Buffer delays and wiring delays are the two most significant factors contributing to skew. The clock topology can significantly contribute to skew.

Jitter can be defined as the deviations in a clock's output transition from their ideal positions. The deviation can either be leading or lagging behind the ideal position. Jitter is usually specified in +/- picoseconds. Jitter measurements can be classified into three categories: cycle-to-cycle jitter, period jitter, and long-term jitter. Cycle-to-cycle jitter is the change in a clock's output transition from its corresponding position in the previous cycle. Period jitter is the maximum change in a clock's output transition from its ideal position. Long-term jitter measures the maximum change in a clock's output transition from its ideal over a large number of cycles.

SUMMARY

Clock skew in an integrated circuit, such as a microprocessor, may be detected measured and compensated for using phase detectors and variable delay adjusters. A clock skew detector, or delay controller, may include one or more variable delay adjusters, one or more phase detectors, such as a modified SR latch, an edge filter state machine and/or a digital counter, according to some embodiments. For instance, phase detectors may be distributed throughout a clock distribution network, such as a clock tree, such that each phase detector taps into two different clock signals. The phase detectors may be configured to analyze the two clock signals and determine whether one signal leads the other, thus indicating clock skew between the two signals. The output of the phase detectors (each of which may output an edge coded version of how often one clock signal leads another) may be measured and counted over a large number (such as 2 million) of clock cycles. For example, an iterative tester algorithm may be used to detect the amount of skew and to adjust one or more variable delay adjusters to correct for the measured clock skew. The difference between the number of times one signal leads or lags behind the other may be used to determine the amount of delay to apply to the leading clock signal in order to minimize (reduce) skew between the two clock signals. Individual delay adjusters on the clock signals may be adjusted to correct for measured clock skew. The same technique may then be applied to additional clock signals to reduce the skew between those two signals. The process may be repeated as needed to detect and manage the skew across the interface between a clock distribution network, such as a clock tree or other clock grid, and other clocked elements.

In addition, the variable delay adjusters may in some embodiments be utilized to correct duty cycle errors detected in a clock signal. Thus, in addition to correction for clock skew, a delay controller may also be configured to adjust the duty cycle of a clock signal, such as to ensure a 50% duty cycle, according to one embodiment. In some embodiments, the same variable delay adjusters may be used both to compensate for click skew and to correct duty cycle errors.

Additionally, the same techniques for detecting and measuring clock skew may also be used to detect and measure jitter in the clock signals, according to some embodiments. For example, in a system with no clock skew or in a system for which clock skew has been compensated using variable delay adjusters, as described herein, the jitter may be expected to effect each clock signal equally. Thus, after correcting for skew, the jitter may be expected to cause a first clock signal to lead a second clock signal about as many times as the second clock signal leads the first clock signal. By configuring variable delay adjusters on the clock signals, the amount of jitter in the clock signals can be measured or characterized.

BRIEF DESCRIPTION OF THE DRAWINGS

A better understanding of the present invention can be obtained when the following detailed description is considered in conjunction with the following drawings, in which.

Figure 1A:
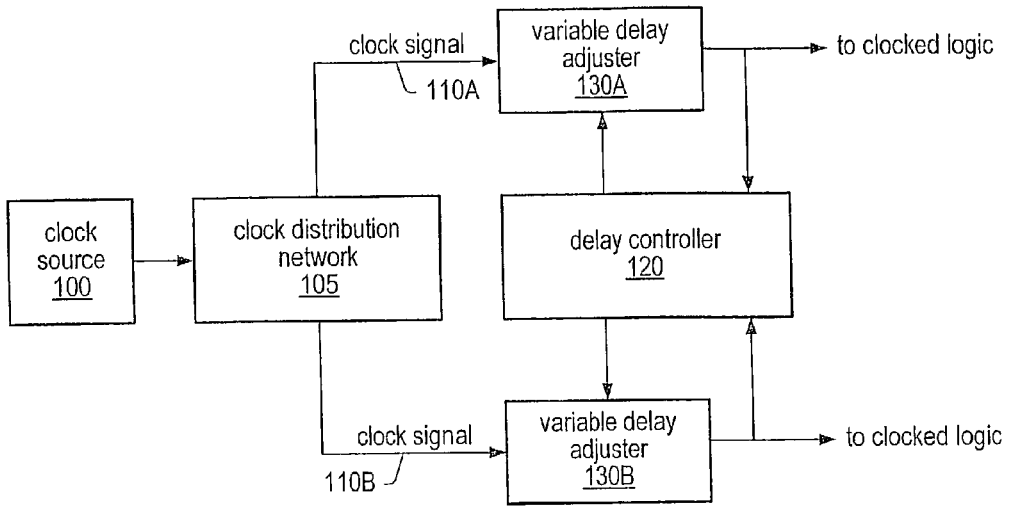
FIG. 1A is a block diagram illustrating a system for determining, measuring and correcting clock skew in an integrated circuit, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION OF EMBODIMENTS

As noted above, clock skew, duty cycle and/or clock jitter may be detected, measured and, in some cases, corrected using phase detectors, digital counters and adjustable delay controllers. FIG. 1A is a block diagram illustrating one embodiment of circuit logic for determining and correcting clock skew in an integrated circuit. As illustrated in FIG. 1A, an integrated circuit may include a clock source 100 that is routed through a clock distribution network 105 to divide or split the clock signal into multiple signals, such as clock signals 110A and 110B. For example, clock distribution network 105 may represent a clock tree, grid, or other distribution network, according to various embodiments. While FIG. 1A only shows two resultant clock signals, namely 110A and 110B, FIG. 1A only illustrates a single, exemplary embodiment and other embodiments may include many more clock signals output from clock distribution network 105. As noted above, variable delay adjusters, such as variable delay adjusters 130A and 130B may be utilized to advance or retard a particular clock signal to correct or minimize skew between clock signals 110A and 110B. A delay controller, such as delay controller 120 may be configured to determine and measure the amount of skew between different clock signals and to configure variable delay adjusters 130A and 130B in order to correct for the amount of measured clock skew. For example, if delay controller 120 determines that clock skew is causing signal 110A to consistently lead clock signal 110B, delay controller 120 may be configured in some embodiments, to retard (or advance) the edges of clock signal 110A to compensate for the amount of measured skew. Please note that in some embodiments the same result (i.e. the correction or minimization of clock skew between signals 110A and 110B) may be achievable by either advancing the lagging clock signal or retarding the leading the leading clock signal. Please note that for ease of discussion, the following descriptions here will refer mainly to retarding the leading signal. However, it should be remembered that advancing the lagging signal may also correct or compensate for clock skew. Additionally, rather than advancing the lagging clock signal, the lagging clock signal may be retarded until it lines up with the other clock signal, in some embodiments.

Furthermore, when configuring variable delay adjusters to compensate for a measured skew between two clock signals, both the rising and falling edges of the relevant clock signal may be retarded and/or advanced in order to avoid changing the duty cycle of the clock signal. In other words, when adjusting a clock signal to compensate for skew, both the rising and falling edges of the clock signal may be adjusted symmetrically to avoid changing the duty cycle of the clock signal.

Variable delay adjusters, such as variable delay adjusters 130A and 130B may be implemented in various manners, according to different embodiments. In some embodiments, a variable delay adjuster may be configured to allow for incremental adjustment of the amount of delay introduced. In one embodiment, a variable delay adjuster may include a series of inverters, for which the pull up or pull down of each can adjusted to vary the actual delay characteristics of the inverter. Thus, by adjusting the pull up or pull down of one or more of the series of inverters, the rising or falling edge of a signal may be retarded or advanced to allow the delay controller to compensate for clock skew and/or to adjust duty cycles. In some embodiments, the use of a series of inverters may allow more finely tuned adjustment of clock signals. In other embodiments, however, other methods implementing variable delay adjusters may be utilized to allow a delay controller to compensate for clock skew and to correct duty cycle errors.

Figure 1B:
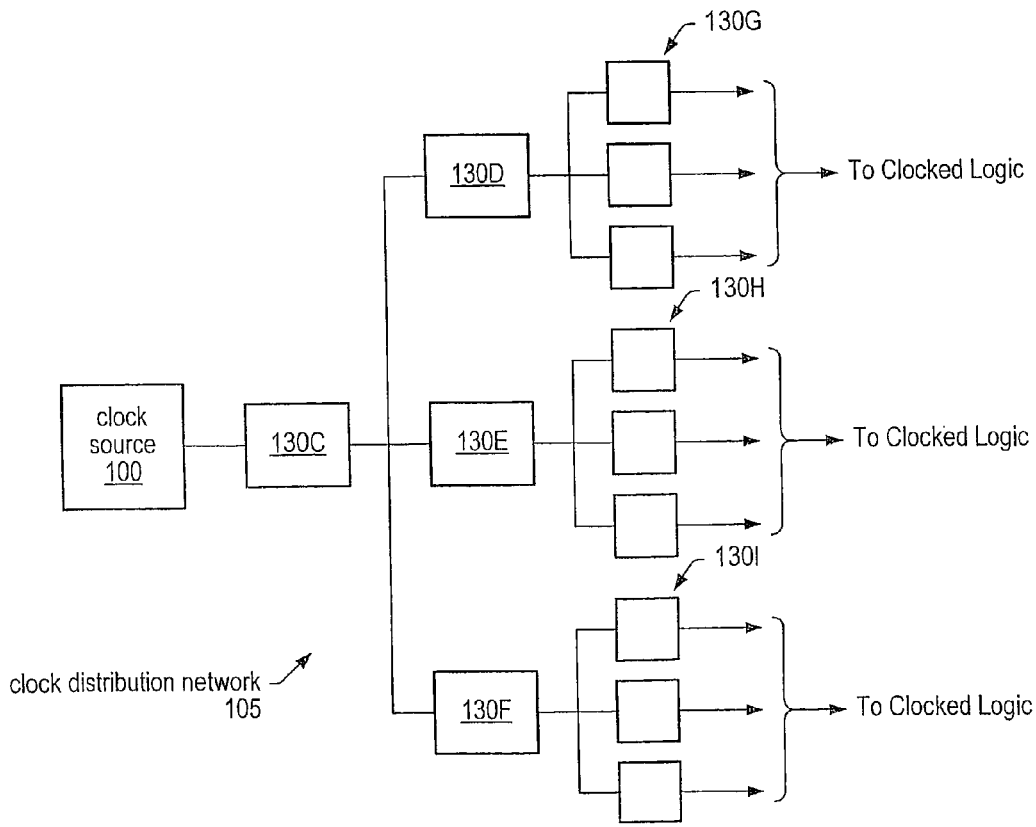
FIG. 1B is a block diagram illustrating, according to one embodiment, variable delay adjusters located at various points across a clock distribution network.

While FIG. 1A, discussed above, only illustrates two variable delay adjusters, in other embodiments, many more variable delay adjusters may be included in an integrated circuit to enable measuring and compensating for clock skew, adjusting duty cycles, and measuring jitter in clock signals. For example, FIG. 1B is a block diagram illustrating one embodiment of clock distribution network 105 including multiple variable delay adjusters located at various points across the clock distribution network. For example, a clock distribution network 105 may include variable delay adjusters located at the clock source edge of the clock distribution network, such as variable delay adjuster 130C, in one embodiment. In other embodiments, variable delay adjusters may be located at points within the clock distribution network, such as variable delay adjusters, 130D, 130E and 130F in FIG. 1B. Similarly, in yet other embodiments, variable delay adjusters may be located at the consumer edge of a clock distribution network, such as variable delay adjusters 130G, 130H and 130I. In some embodiments, variable delay adjusters may be located at both the source edge and the consumer edge as well as at points within a clock distribution network, such as illustrated in FIG. 1B.

The exact position of variable delay adjusters within an integrated circuit and with respect to a clock distribution network may vary from embodiment to embodiment and depending upon the whether a delay controller for the integrated circuit is configured to measure and compensate for clock skew, correct duty cycle errors, measure signal jitter, or a combination of all three.

Figure 2:
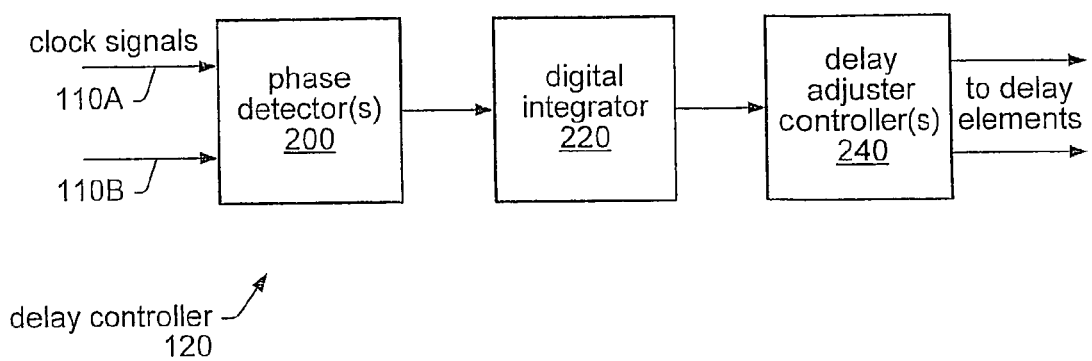
FIG. 2 is a block diagram illustrating one embodiment of a delay controller for determining, measuring and correcting clock skew in an integrated circuit, according to one embodiment.

As discussed above regarding FIG. 1A, a delay controller 120 may be configured to detect and measure an amount of skew between clock signal 110A and clock signal 110B and to configure variable delay adjusters 130A and 130B to correct for the amount of measured skew. FIG. 2 illustrates one embodiment of a delay controller 120, according to one embodiment. As noted above, phase detectors may be used to determine whether one clock signal leads another. For example, delay controller 120, as illustrated in FIG. 2, may include multiple phase detectors 200, each configured to determine whether one clock signal leads another. Thus, phase detector 200 may be configured to determine whether clock signal 110A leads clock signal 110B. A digital integrator and/or digital counter may be configured to receive an output from phase detectors 200 and to count the number of times one clock signal leads the other over a large number of clock cycles to determine and measure the amount of skew between the two signals. For example, if no skew existed between clock signals 110A and 110B, one would expect that clock signal 110A would lead clock signal 110B about as many times as clock signal 110B leads clock signal 110A. Thus, by using a ratio representing the number of times one clock signal leads another over a large number of clock cycles, digital integrator 220 may be configured to determine the amount of skew between the two clock signals. For instance, in a system that does not have any clock skew, digital integrator 220 may determine that clock signal 110A leads clock signal 110B about 5000 times over 10000 clock cycles. If digital integrator 220 determines that clock signal 110A leads clock signal 110B more than 50% of the time, delay controller 120 may be configured to configure or adjust one or more variable delay adjusters 130 to correct of the amount of measured skew. For example delay controller 120 may include one or more delay adjuster controllers 240 to adjust the variable delay adjusters 130.

In some embodiments, delay controller 120 may be configured to measure the amount of skew between two clock signals repeatedly while configuring the variable delay adjusters between each measurement cycle in order to verify that the skew is being corrected or minimized. Thus, in one embodiment, delay controller 120 may first detect and measure an initial amount of skew between clock signals 110A and 110B, configure variable delay adjusters 130 to correct the measured amount of skew and then to again measure the amount of skew between the two signals. Delay controller 120 may be configured to re-configure the variable delay adjusters after each subsequent skew measurement cycle. In some embodiments, delay controller 120 may be configured to measure various pairs of clock signals in turn, configuring respective variable delay adjusters after each measurement cycle. Delay controller 120 may be configured to first measure and correct skew between various pairs of clock signals and then measure and adjust skew between individual clock signals from the pairs of previously measured clock signals. For example, in one embodiment, delay controller 120 may be configured to first measure and correct for skew between clock signals A and B and then to measure and correct for skew between two additional clock signals, say clock signals C and D. Additionally, delay controller 120 may then be configured to measure and correct for skew between clock signals A and C and between clock signals B and D.

In some embodiments, delay controller 120 may be configured to continually measure and adjust skew between clock signals of an integrated circuit during execution of the integrated circuit. In other embodiments, however, a tester or other engineer may cause delay controller 120 to measure and adjust the skew between clock signals until skew measured between any two clock signals is within some tolerance. After measuring and correcting the clock skew for an integrated circuit, the tester or engineer (or in some embodiments, delay controller 120) may then fix the configuration of the various variable delay adjusters. For example, fuses included in variable delay adjusters may be used to permanently fix the amount of retardation and/or advancement induced on the various clock signals, according to one embodiment. In other embodiments, digital logic, firmware and/or software may used to configure variable delay adjusters, either one time or dynamically. Thus, in some embodiments skew may be continually measured and adjusted. In other embodiments, skew may be measured and initially adjusted once and, once determined, adjustment values may be used from then on when the integrated circuit is executed.

Additionally, in some embodiments delay controller 120 may be configured to measure and/or characterize the amount of jitter that may be present in a clock signal. For example, after compensating for any detected clock skew between two clock signals, delay controller 120 may be configured to adjust one or more variable delay adjusters, such as variable delay adjusters 130A and 130B, in order to measure how the introduced delay effects the number of times one clock signal leads the other clock signal, thereby determining the magnitude of jitter present in the clock signals. Measuring and characterizing jitter will be discussed in more detail below regarding FIG. 9.

In addition, variable delay adjusters, such as variable delay adjusters 130A and 130B may, in some embodiments, be used to adjust the duty cycle of a clock signal. For example, delay controller 120 may be configured to detect duty cycle errors in clock signals and to adjust the edges of the clock signal, such as via variable delay adjuster 130A and/or 103B, in order to correct the duty cycle of the clock signal. In general any suitable method of detecting a duty cycle error may be utilized, according to various embodiments. For example, an RC filter may be used to extract the DC component of a clock signal. The DC component, which may be considered the duty cycle of the signal, may then be compared to a mid-rail voltage, such as by using a sense amp to create a set of samples. Such samples may indicate an error in the duty cycle of the clock signal. In another embodiment, a charge pump may be used to pump a current into a capacitor during the high phase of a clock signal. The current in the capacitor may then extracted during the low phase of the clock signal. If the output of the capacitor changes from cycle to cycle, it may indicate that the duty cycle is not 50%, according to one embodiment. However, as various methods for detecting duty cycle errors are well known in the art, they will not be discussed in detail herein.

When using variable delay adjusters, such as variable delay adjusters 130A and 130B to correct duty cycle errors, delay controller 120 may be configured to advance or retard just one edge (either the rising or the falling edge) of a clock cycle, according to one embodiment. Alternatively, in other embodiments, delay controller 120 may be configured to asymmetrically adjust both the rising and falling edges of a clock cycles to correct a detected duty cycle error. In some embodiments, delay controller 120 may be configured to determine and correct both clock skew and duty cycles errors at the same times. In other embodiments, however, compensating for clock skew and correct duty cycle errors may be performed separately by delay controller 120.

Figure 3A:
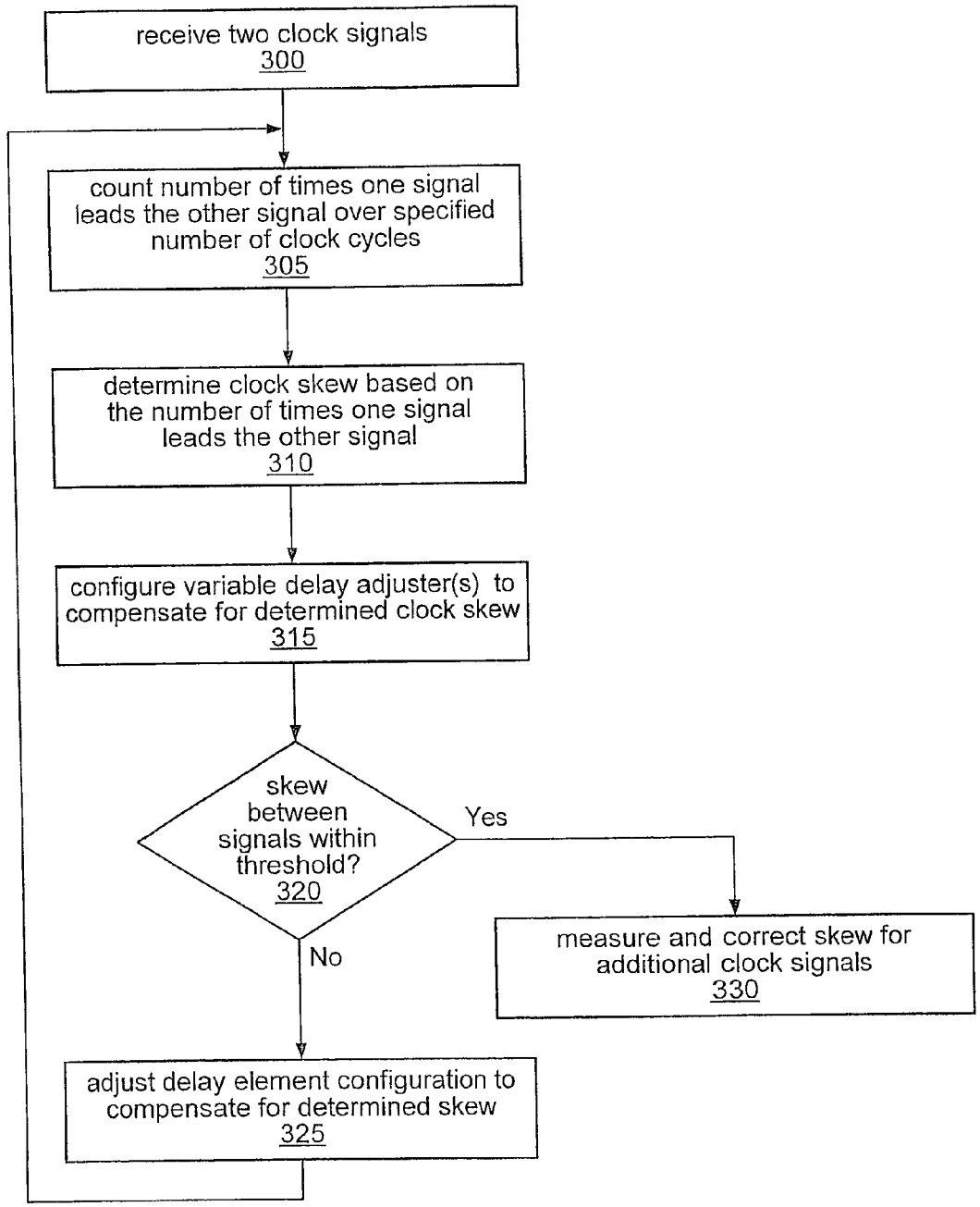
FIG. 3A is a flowchart illustrating one embodiment of a method for determining, measuring and correcting clock skew in an integrated circuit.

FIG. 3A is a flowchart illustrating one embodiment of a method for detecting, measuring and adjusting for skew among clock signals in an integrated circuit. As noted above, a delay controller may be configured to measure and adjust skew between pairs of clock signals. Thus, as illustrated by block 300, a delay controller 120 may receive two clock signals, such as clock signals 110A and 110B, discussed above. As described above, a clock source may provide a clock signal that may be split into multiple signals, such as via a clock tree or other circuitry configured to increase the number of clock signals. In some embodiments, a skew controller may receive two clock signals that originate from the same clock source that has been split or divided. In other embodiments, a skew controller may receive clock signals originating from two separate, but synchronized, clock sources. For example, as illustrated in FIG. 1A, discussed above, clock source 100 outputs a clock signal to clock distribution network 105, which divides, splits or multiplies the clock signal to output two or more clock signals, such as clock signal 110A and 110B.

In order to measure the amount of skew between clock signals 110A and 110B, delay controller 120 may count the number of times one signal leads the other signal over a specified number of clock cycles, as illustrated by block 305. As described above, delay controller 120 may include phase detectors configured to repeatedly determine whether one clock signal leads the other clock signal. For example phase detector 200 may be configured to repeatedly determine whether clock signal 110A leads clock signal 110B and to output a signal that indicates for successive clock cycles whether clock signal 110A leads clock signal 110B. For instance, in one embodiment, phase detector 200 may be configured to output a signal that transitions from high to low (and then back to high again) whenever clock signal 110A leads clock signal 110B. The signal output from phase detector 200 may be considered an edge-coded version of whether one of the clock signals leads the other. Thus, delay controller 120 may be configured to count, using information output from phrase detector(s) 200, the number of times that one clock signal leads the other over a certain number of clock cycles.

The exact number of clock cycles over which delay controller 120 measures skew between two clock signals may vary from embodiment to embodiment. In general the larger the number of clock cycles used, the more accurate the measurement of skew. However, the larger the number of clock cycles used, the longer each measurement cycle takes. Thus, different number of clock cycles may be used in different embodiments according to the specific nature of each embodiment. For example, in an embodiment where skew measurement and correction is performed only initially and then the determined amount of skew correction is used from then on without performing additional skew measurements, it may be worth the extra time required to measure skew over a large number of clock cycles. However, in an embodiment where delay controller 120 is configured to continually measure and correct clock skew while an integrated circuit is executing or in embodiments where delay controller 120 is configured to measure and adjust skew upon startup of an integrated circuit, the less accurate skew measurement may be used because of the resulting shorter overall measurement cycle.

As illustrated by block 310, a delay controller 120 may be configured to determine clock skew based on the number of times one clock signal leads the other clock signal, according to some embodiments. As discussed above, a skew controller may involve a phase detection system for determining whether one of the clock signals leads the other. In some embodiments, the number of times that one of the clock signals leads the other is used as a measure of the amount of skew between the two signals. For example, if the number of times clock signal 110A leads clock signal 110B over the course of, say, 100,000 clock cycles, is 50000, then clock signal 110B also lead clock signal 110A 50000 times as well. Thus, a skew controller may determine that since neither of the clock signals consistently leads the other, no significant skew is present. In another example, if clock signal 110A leads clock signal 110B more than 50% of the time, the skew controller may determine that significant skew between the two signals exists. For example, if clock signal 110A leads clock signal 110B 7500 times out of 10000 measured clock cycles, a ration of 7500/10000 or 0.75 may be used to represent the skew between clock signals 110A and 110B. Please note that while a representative number of 10000 clock cycles is used throughout the discussion of skew measurement and correction herein, in other embodiments clock skew may be measured over much larger numbers of clock cycles. The exact thresholds used by a skew controller to determine whether skew exists between two clock signals and the amount of such skew may vary from embodiment to embodiment. In some embodiments, a skew controller may be configured to adjust the threshold used for determining skew based on user (engineer, tester, etc) input or on feedback from previous skew measurements.

In general, the more skew that exists between two clock signals, the more one of the signals will lead the other over a large number of clock cycles. In some embodiments, delay controller 120 may be configured to configure variable delay adjusters, such as variable delay adjusters 130A and 130B to compensate for the determined clock skew, as indicated by block 315. For example, if delay controller 120 determines that clock signal 110A leads signal 110B, delay controller 120 may be configured to configure variable delay adjuster 130A (in the path of clock signal 110A) to retard the leading edges of clock signal 110A to compensate for the measured skew.

Please note, as described above, delay controller 120 may advance the leading edges of clock signal 110B to effect the same skew compensation. Similarly, given the cyclical nature of clock signals, rather than retarding the leading edges of clock signal 110A delay controller 120 may advance the leading edges of clock signal 110A to the point where the skew between the two clock signals is compensated. Please note that by advancing a leading clock signal until skew is minimized, the two clock signals may be aligned, but using two different clock pulses. In general, it may only matter that two clock signals transition within a certain tolerance, not that they are transitioning due to the exact same clock pulse.

The skew controller may then determine whether the measured skew between the two clock signals is with an allowed threshold, as indicated by block 320. In some embodiments, the allowable threshold for skew between two clock signals may be specified, such as by an engineer or chip manufacturer. For example, a chip manufacturer may specify a maximum allowable amount of skew between clock signals above which portions of the chip circuit may not function properly. In other embodiments, the threshold may be determined automatically by the skew controller based on current operating characteristics of the chip. Whether the measured skew is within such a threshold may be determined by a simple comparison in some embodiments, while in other embodiments more complex scheme for determining whether a measured skew value is within tolerance or threshold.

If the determined skew between the two clock signals is not within the allowable threshold, the skew controller may be configured to adjust the configuration of one or more delay elements to compensate for the determined skew, as indicated by block 325. As noted above, delay controller 120 may be configured to adjust one or more variable delay adjusters, such as variable delay adjusters 130A and 130B, to compensate for the amount of skew measured between clock signals 110A and 110B. If, however, the amount of skew measured between clock signals 110A and 110B is within threshold, as indicated by the positive output of block 320, delay controller 120 may be configured to measure and correct skew between additional pairs of clock signals, as indicated by block 330. As noted above, a delay controller may be configured to measure and correct clock skew between various pairs of clock signals of a integrated circuit and may be configured to measure and correct skew between different pairs of clock signals until all clock signals have been measured, or to continually measure and adjust for clock skew throughout execution of an integrated circuit, according to different embodiments and configurations.

Figure 3B:
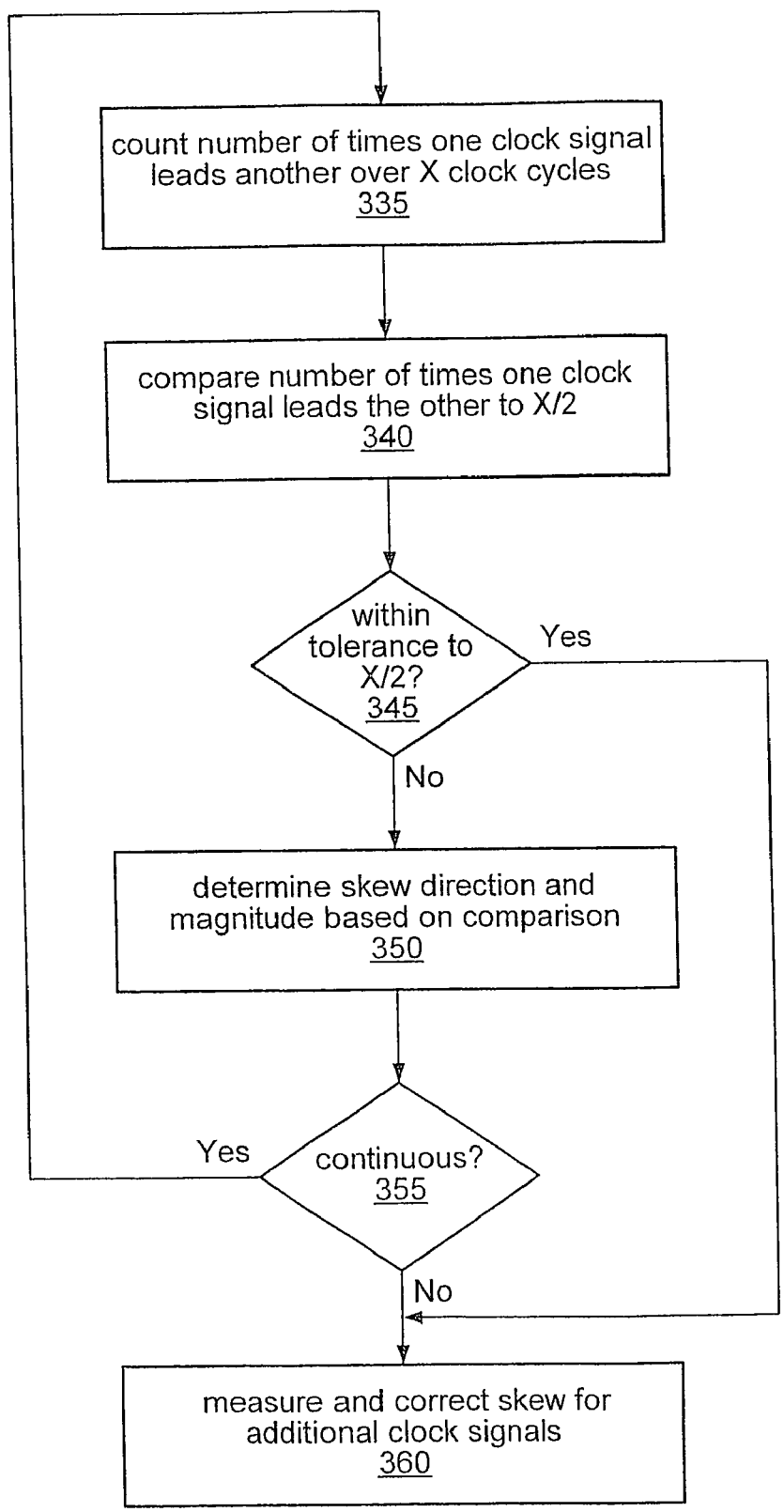
FIG. 3B is a flowchart illustrating one embodiment of a method for continuously determining, measuring and correcting clock skew in an integrated circuit.

FIG. 3B is a flowchart illustrating one embodiment of a method for continuously measuring and correcting clock skew between clock signals. As described above, delay controller 120 may be configured to measure the skew between two clock signals. As indicated by block 335, in one embodiment, delay controller 120 may be configured to count the number of times one clock signal leads another over X number of clock cycles. As discussed above, in general the larger the number of clock cycles over which delay controller 120 measures skew between two clock signals, the more accurate the skew measurement may be. After counting the number of times one clock signal, such as clock signal 110A leads another clock signal, such as clock signal 110B, delay controller 120 may be configured to compare the number of times clock signal 110A leads clock signal 110B to X/2 (as in block 340), where X represents the number of clock cycles over which skew between the two signals was measured. As noted above, in general if no skew exists between two clock signals, each signal may be expected to lead the other signal about one half of the time, hence the comparison to X/2. If, as indicated by the positive output of decision block 345, delay controller 120 determines that the measured skew is within a specified tolerance of X/2, delay controller 120 may proceed to measure and correct skew for additional clock signals, as described above and illustrated by block 360.

If, however, delay controller 120 determines that the measured amount of skew between the two clock signals is not within a specified tolerance of X/2, as indicated by the negative output from decision block 345, delay controller 120 may determine a direction and magnitude of the skew based on the comparison of the number of times one clock signal lead the other to X/2. For example, if clock signal 110A leads clock signal 110B 7500 times over 10000 clock cycles, the direction of skew may be determined to be toward clock signal 110A and a magnitude may be determined based on the fact that clock signal 110A lead clock signal 110B three times more than clock signal 110B lead clock signal 110A. However, please note that the exact manner in which skew direction and magnitude, as well as the units used to characterize skew direction and magnitude may vary from embodiment to embodiment.

As described above, in some embodiments, delay controller 120 may be configured to use the determined skew direction and magnitude to configure one or more variable delay adjusters to compensate for the measured skew. In other embodiments, however, delay controller 120 may be configured to generate an indication of the determined skew direction and magnitude and may also be configured to output the indication of skew, such as via a hardware debug system or JTAG port, to a test (or other) engineer. In such embodiments, the test engineer may use the direction and magnitude of skew determined by delay controller 120 to manually configure the variable delay controllers to compensate for clock skew. For example, in one embodiment, delay controller 120 may be configured to continually measure the skew between two clock signals, as indicated by the positive output of block 355, and may also be configured to continually output an indication of the determined skew direction and magnitude, thereby allowing a test engineer to fine tune the configuration of variable delay adjusters to properly compensation for the measured clock skew between two clock signals.

If delay controller 120 is not configured to continuously measure the skew between two clock signals, or if the skew between the two signals is within tolerance, delay controller may be configured to measure and correct clock skew between additional clock signals, as indicated by block 360, as described above.

Figure 3C:
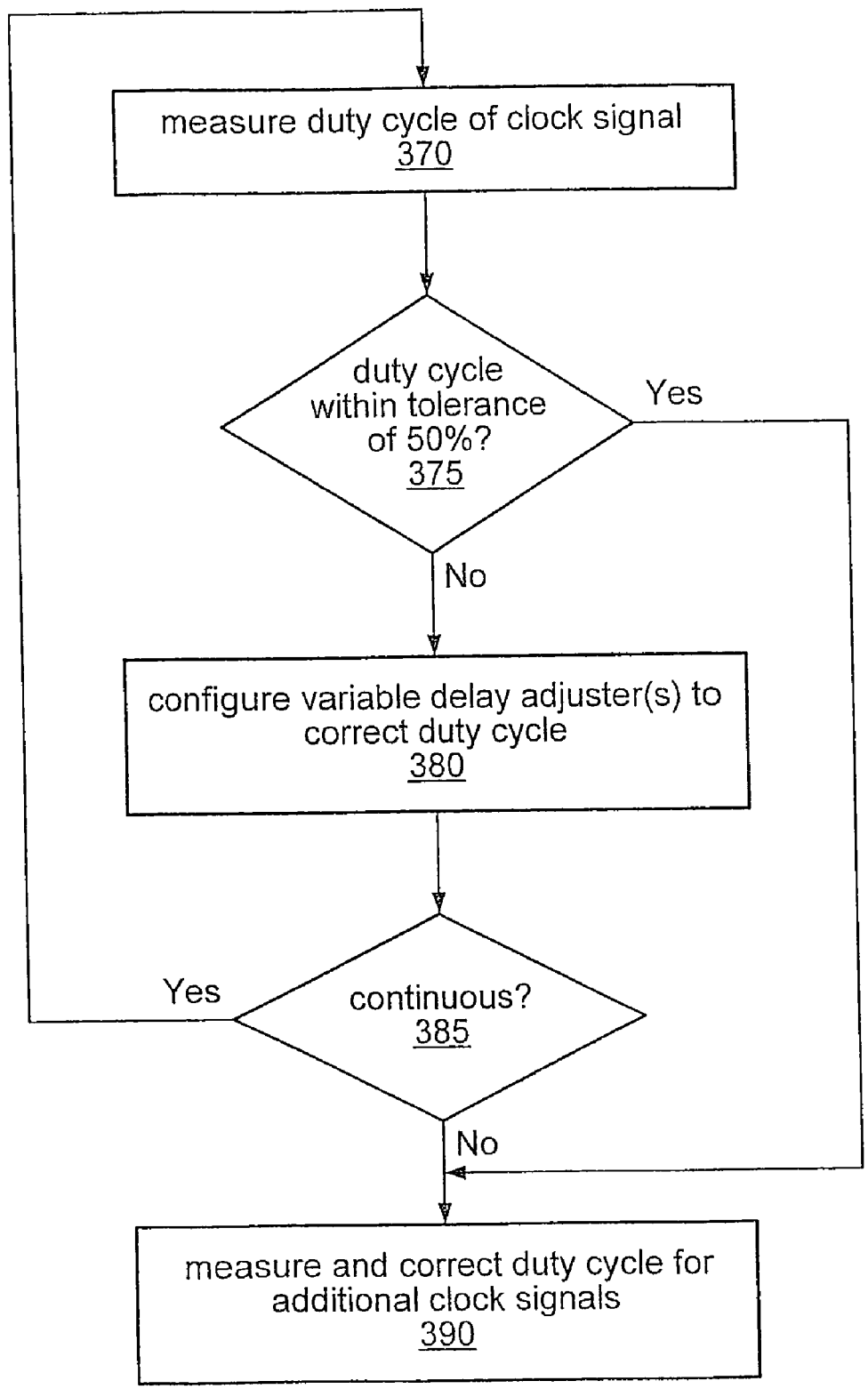
FIG. 3C is a flowchart illustrating one embodiment of a method for adjusting the duty cycle of a clock signal using variable delay adjusters, as described herein.

As noted above, delay controller 120 may be configured to detect and correct duty cycle errors in clock signals, such as clock signal 110A and 110B, according to some embodiments. FIG. 3C is a flowchart illustrating one embodiment of a method for adjusting the duty cycle of a clock signal. As indicated by block 370, delay controller 120 may be configured to measure the duty cycle of a clock signal and may also be configured to determine whether the duty cycle is with a certain tolerance of 50%, as indicated by block 375, in some embodiments. Various methods for measure the duty cycle of a clock signal, as are well known in the art, may be utilized in various embodiments. For example, in one embodiment, delay controller 120 may be configured to use a RC filter to determine the duty cycle of a clock signal. In another embodiment, delay controller 120 may utilize a charge pump and a capacitor to determine whether there is any duty cycle error in a clock signal. As various methods for determining both the duty cycle of a clock signal and for detecting duty cycle errors are well known in the art, the detail of detecting a duty cycle error will not be discussed in detail herein. In general any suitable method for determining a duty cycle error may be utilized in various embodiments.

After determining that the duty cycle for a particular clock signal does not fall within a specified tolerance of 50%, delay controller 120 may configure one or more variable delay adjusters to modify the duty cycle of the relevant clock signal, as indicated by block 380. For example, delay controller 120 may advance or retard either the rising or falling edge, or both, of a clock signal in order to adjust the duty cycle and correct a detected duty cycle error, according to various embodiments. In some embodiments, delay controller 120 may be configured to detect and correct duty cycle errors on clock signals prior to measuring and correcting clock skew for a pair of clock signals. For example, in one embodiment, delay controller 120 may be configured to first check for and correct any duty cycle errors for clock signals 110A and 110B and only after both clock signals exhibit a 50% duty cycle (or a duty cycle within a specified tolerance to 50%) measure and compensate for any clock skew between clock signal 110A and 110B. In other embodiments, however, delay controller may be configured to first measure and compensate for any clock skew between the two clock signals and then correct any duty cycle errors for the signals. When correcting duty cycle errors after compensating for clock skew, delay controller 120 may be configured to take into account the adjustments made to compensate for clock skew when configuring variable delay adjusters to correct duty cycle errors. In other embodiments, however, if a duty cycle error is detected after a clock signal has been adjusted to compensate for clock skew, delay controller 120 may be configured to correct the detected duty cycle error and then re-measure and re-compensate for any additional clock skew between clock signals.

As described above regarding measuring and compensating for clock skew, delay controller 120 may, in some embodiments, be configured to continuously detect and correct for duty cycles errors. Thus, as indicated by the positive output of block 385, delay controller 120 may be configured to repeat the measuring of a duty cycle for a clock signal and to re-configure one or more variable delay adjusters to correct for any additional or remaining duty cycle errors detected. If, as indicted by the positive output of decision block 375, delay controller determines that the duty cycle for clock signal is within a specified tolerance of 50% or if delay controller 120 is not configured to continuously check for duty cycle errors, as indicated by the negative output of block 385, delay controller may be configured to measure and correct the duty cycle for additional clock signals, as indicated by block 390. In some embodiments delay controller 120 may be configured to check for and correct duty cycle errors in all clock signals. In other embodiments, delay controller 120 may be configured to check for and correct duty cycle errors for a clock signal only when also measuring and compensating for clock skew between that clock signal and other clock signals. In other words, in some embodiments, delay controller 120 may detect and correct duty cycle errors for all clock signals independently of measuring and compensating for clock skew, while in other embodiments delay controller 120 may detect and correct duty cycle errors for a clock signal only when also measuring and correctly clock skew for the same clock signal.

In some embodiments, the same variable delay adjusters may be used to both compensate for clock skew and to correct duty cycle errors. In other embodiments, however, an integrated circuit may include separate sets of variable delay adjusters to allow delay controller 120 to configure one set to compensate for clock skew and to configure another set to correct duty cycle errors.

Figure 4A:
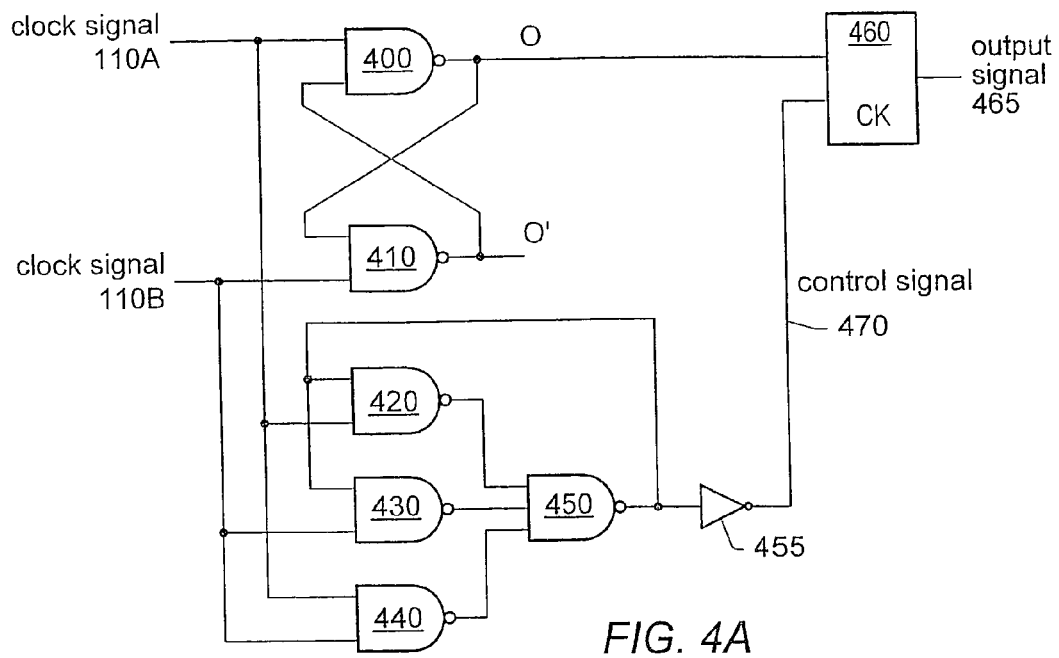
FIGS. 4A-4C illustrate various embodiments of phase detection logic circuitry for determining when one clock signal leads another as part of determining, measuring and correcting clock skew in an integrated circuit.

As discussed above, delay controller 120 may be configured to utilize phase detectors to determine whether one clock signal leads another clock signal. FIG. 4A illustrates one embodiment of phase detector logic that may, in some embodiments, be utilized to determine whether one clock signal leads another. The logic circuitry illustrated in FIG. 4A also includes additional logic to provide an asynchronous state machine that, when combined with a RS latch (illustrated by elements 400 and 410) produce an output signal indicating when clock signal 110A leads clock signal 110B. Please note that the workings and truth tables of logic elements such as NAND and inverter gates are well understood in the art and will not be discussed in detail herein. FIG. 4A illustrates only one possible implementation of logic circuitry configured to determine whether one clock signal leads another clock signal and to output a signal that indicates, over multiple clock cycles, when one clock signal leads another signal. In other embodiments, different arrangements and logic designs may be used to determine when one clock signal leads another. As illustrated in FIG. 4A, two clock signals 110A and 110B are input into various elements of the phase detection logic.

In some embodiments, in order to properly determine when clock signal 110A leads clock signal 110B, elements 400 and 410, which otherwise make up a SR latch, are initialized to what would normally be considered an illegal state. For instance, clock signals 110A and 110B both may be initialed to a low state, thus setting up a race condition between the outputs (O and O') from elements 400 and 410. When both clock signals 110A and 110B are low, both outputs (O and O') are continually held high thus creating the race condition, according to one embodiment. For instance, the output O of NAND element 400 remains high so long as one of the two inputs to NAND element 400 is low. Only when both inputs to NAND element 400 are high does output O from NAND element 400 transition low. Similarly, only when both inputs to NAND element 410 are high will output O' go low. In other words, so long as both clock signal 110A and clock signal 110B are both low, the outputs O and O' will both remain high.

In some embodiments, the phase detection logic of FIG. 4A may be configured so that such a race condition is resolved by the first input (either clock signal 110A or 110B) to transition high. For example, if clock signal 110B transitions high first, output O remains high while output O' transitions low. Thus, in such an example, while clock signal 110A is low and clock signal 110B is high, the outputs O and O' remain high and low respectively. Additionally, the phase detection logic of FIG. 4A may be configured such that after one of the input clock signals transitions high the outputs O and O' remain unchanged if the other clock signal also transitions high before the entire circuitry is reset for the next measurement. As noted above, in some embodiments, if clock signal 110B transitions high before clock signal 110A (signal 110B leading signal 110A), output O' transitions low, while output O remains high. Subsequently, if clock signal 110A transitions high, outputs O and O' remain unchanged (high and low respectively) because the low state of output O' prevents NAND element 400 from transitioning its output O low. Thus, while the phase detection logic illustrated by FIG. 4A includes the elements of a SR latch, those elements are not used in the traditional manner of a SR latch.

Additionally, the phase detection logic may be configured to reset (or re-enter the race condition) when clock signal 110B transitions low again, according to some embodiments. In general the phase detection logic described herein may be configured to reset when whichever clock signal initially transitioned high first subsequently transitions low. For instance, after both clock signals 110A and 110B have transitions high, and outputs O and O' are high and low respectively, as described in the example given above, if clock signal 110B then transitions low again, output O' transitions high, thus resetting the initial race condition described above (i.e. both outputs O and O' are high). Subsequently when clock signal 110A transitions low, the outputs O and O' remain unchanged (both high).

By including additional logic, such as represented by elements 420, 430, 440, 450 and 455, a control signal 470 may be generated allowing the output signal 465 of element 460 to transition only when the leading edge of clock signal 110A is early with respect to the leading edge of clock signal 110B. In other words, output signal 465 may only go low when clock signal 110A leads clock signal 110B. FIG. 4A illustrates one possible design for generating control signal 470. As illustrated, NAND element 440 takes clock signals 110A and 110B as inputs, NAND element 430 receives clock signal 110B and the output of NAND element 450 as inputs and NAND element 420 takes clock signal 110A and the output of NANE element 450 as inputs, according to one embodiments. NAND element 450 takes the respective outputs of NAND elements 420, 430 and 440 as inputs. Thus, only if the outputs of all three NAND elements 420, 430 and 440 are high will the output of NAND 450 be low, otherwise the output of 450 will be high.

According to the embodiment illustrated by FIG. 4A, the output of NAND element 440 will be high unless both clock signals 110A and 110B are high. Since, as described above, clock signals 110A and 110B are initially low, the output of NAND 440 will initially be high, according to one embodiment. Similarly, since the respective outputs of NAND elements 420 and 430 will be high if either of the input to the respective NAND element is low and since clock signals 110A and 110B are initially low, the outputs of both NAND elements 420 and 430 will initially be high. Thus, the output of NAND 450 will also be low, since the outputs of NAND elements 420, 430 and 440 are all initially high. Consequently, control signal 470 will initially be high since inverter 455 will transition the initially low output of NAND element 450 to high. While the output of NAND element 450 could be directly used to control and latch the element 460, thus controlling output signal 465, in some embodiments, the inverter 455 may be added to the output of NAND 450, such as to allow more time for signal development before control signal 470 falls and latches the data in element 460. Please note that while the phase detection logic illustrated by FIG. 4A is configured to transition output signal 465 when clock signal 110A leads clock signal 110B, in other embodiments phase detection logic may be configured such that output signal 465 transitions low when clock signal 110B leads clock signal 110A.

The output of NAND element 450 only goes high, thereby causing control signal 470 to transition low whenever either clock signal 110A or 110B transitions high. For instance, if clock signal 110A transitions high, the output of both NAND elements 420 and 440 will transition low, causing the output of NAND element 450 to go high. Similarly if clock signal 110B goes high, the outputs of NAND elements 430 and 440 will go low, causing the output of NAND element 450 to go high and consequently causing control signal 470 to transition low. The output of NAND element 450 will only transition low again, causing control signal 470 to transition high when both clock signals 110A and 110B are both low again. Thus, control signal 470 may in some embodiments be used to control when data of element 460 is latched and thereby when output signal 465 transitions. As noted above, control signal 470 is initially high and transitions low whenever either clock signal 110A or 110B transitions high. In other words, a rising edge in either clock signal 110A or 110E may cause a falling edge in control signal 470, thus causing element 460 to latch output O and, possibly, transition output signal 465. Additionally, only after both clock signal 110A and 110B have transitioned back to low will control signal 470 transition high again, thus resetting the phase detection logic circuitry.

Please note that due to the amount of time required for the phase detection circuitry illustrated in FIG. 4A to function output signal 465 may not be able to signal whether one clock signal leads the other for every consecutive clock cycle. Instead, in some embodiments, the phase detection logic of FIG. 4A and therefore delay controller 120 may detect skew based on every other clock cycle or every third clock cycle, according to various embodiments.

Figure 4B:
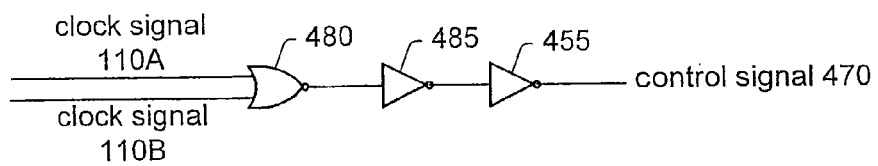

Please note that the arrangement and number of logic elements used in the phase detection logic may vary from embodiment to embodiment. For example, rather than the arrangement of NAND elements 430, 430, 440 and 450 illustrated in FIG. 4A, a single NOR 480 and an inverter 485 may be used, as illustrated by FIG. 4B. As illustrated in FIG. 4B, the output of NOR 480 will be low until both clock signals 110A and 110B are both low. Since, as noted above, both clock signals 110A and 110B are initially low, the output of NOR 480 will also be high, thus causing the output of inverter 485 to be low, consequently causes control signal 470, after inverter 455, to initially be high, as described above regarding the circuitry of FIG. 4A. Thus, if either clock signal 110A or clock signal 110B transitions high, the output of NOR 480 will transition low, causing the output of inverter 485 to transition high, causing control signal 470 to transition low. While the two inline inverters 485 and 455 clearly cause control signal 470 to match the output of NOR 480, as described above, in some embodiments it may be beneficial to have the delay caused by the two inverters (485 and 455) allowing for longer signal development before latching the data of element 460.

Figure 4C:
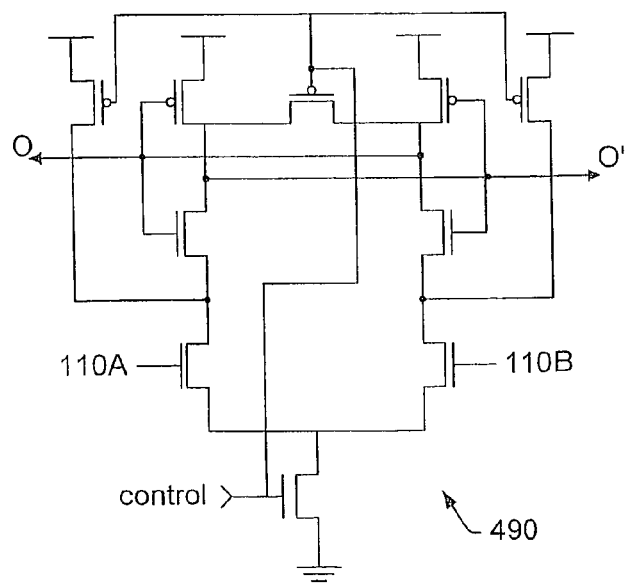

Additionally, as illustrated in FIG. 4C, sense amp circuitry, such as sense amp circuitry 490, may also be utilized to implement an edge-coded signal indicating when one clock signal leads another. In general, various arrangements of logic elements and circuitry may be used to produce an edge-coded signal indicating when one clock signal leads another, as described herein.

Figure 5:
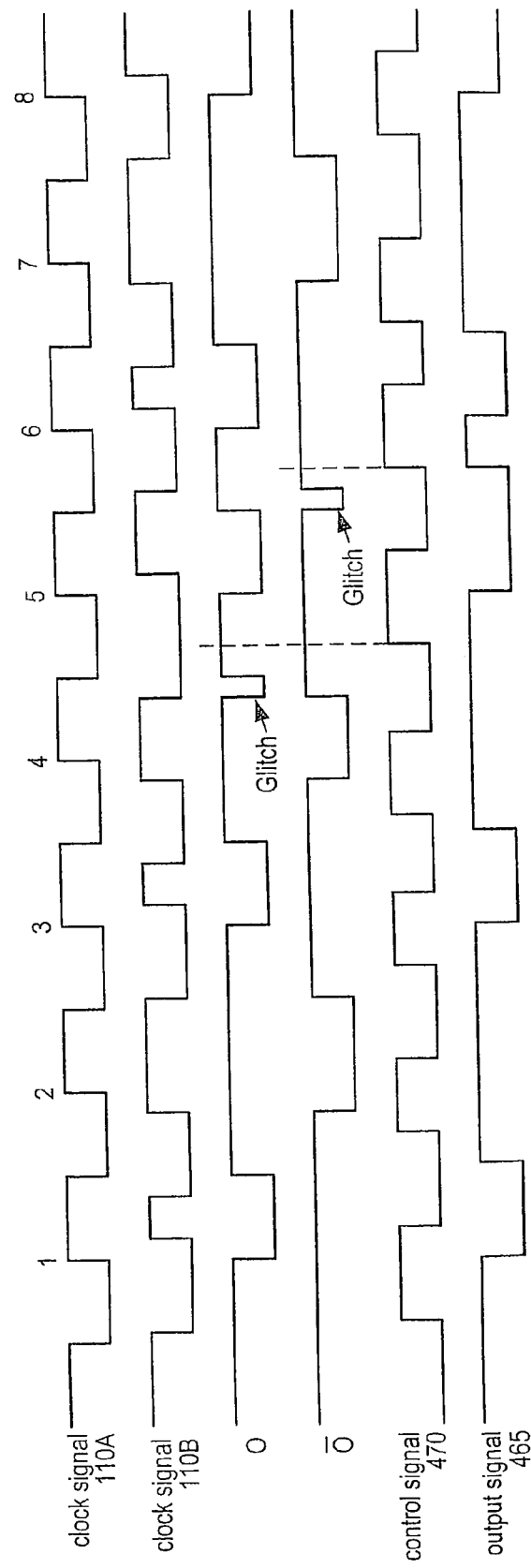
FIG. 5 illustrates various logic signals for determining when one clock signal leads another as part of determining, measuring and correcting clock skew in an integrated circuit, according to one embodiment.

FIG. 5 illustrates the various logic signals described above regarding FIGS. 4A, 4B and 4C across 8 clock cycles. For ease of explanation, please note that clock signal 110A is illustrated as a having a steady, 50/50 duty cycle while clock signal 110B is illustrated as having a variable duty cycle. In other embodiments, however, clock signals 110A and 110B may have different duty cycles, as well as other signal characteristics different than those illustrated in FIG. 5.

As illustrated in FIG. 5 and described above, phase detector 200 takes clock signals 110A and 110B as inputs and outputs signal 465. Also illustrated in FIG. 5 are outputs O and O' as control signal 470. Thus, FIG. 5 illustrates the state of the various signals of phase detector 200 over 8 clock cycles. Once clock cycles 110A and 110B have both fallen, outputs O and O' are both high, setting up the initial race condition described above. Once clock signal 110A transitions high, at number 1, output O goes low. Additionally, output signal 465 also transitions low. However, as described above, in some embodiments control signal 470 may be used to determine when to latch and use output signal 465. So, even though output signal 465 may not actually be transitioned until control signal 470 falls, FIG. 5 illustrates when output signal 465 would transition based purely upon output O. After clock signal 110A rises causing output O to fall, clock signal 110B also rises, causing control signal 470 to fall. Please note, as described above, control signal 470 may be delayed relative to clock signal 110B falling, as illustrated in FIG. 5. Thus, if latched and used when control signal 470 falls, output signal 465 is low indicating that clock signal 110A leads clock signal 110B for this first clock cycle. As described above, it is only after both clock signals 110A and 110B fall again that output O rises, resetting the race condition (i.e. both clock signals are low, both outputs O and O' are high) and causing control signal 470 and subsequently output signal 465 to rise.

For the next clock cycle, FIG. 5 illustrates that clock signal 110B leads clock signal 110A and thus rises first, cause output O' to fall. After clock signal 110A also rises (at number 2) control signal 470 falls, thus triggering the latching and use of output signal 465. However, since in this example, output signal 465 represents an edge-coded version of when clock signal 110A leads clock signal 110B, output signal 465 does not fall, thus indicating that for the second clock cycle, clock signal 110B lead clock signal 110A. As illustrated in FIG. 5, if output signal 465 is read whenever control signal 470 falls, output signal 465 is low when clock signal 110A leads clock signal 110B and is high when clock signal 110B leads clock signal 110B.

Additionally, a glitch may be produced in either output O or output O' whenever clock signals 110A and 110B in order. For example, between numbers 1 and 2 of FIG. 5, clock signal 110A transitions high followed by clock signal 110B transitioning high. Subsequently, clock signal 110B transitions low followed by clock signal 110A transitioning low, which as illustrated in FIG. 5 does not produce any glitch in either output O or output O'. At number 4 of FIG. 5, clock signal 110B first transitions high, causing output O' to fall, followed by clock signal 110A transitioning high. Subsequently, clock signal 110B falls, causing output O' to rise, but also causing output O to fall because until clock signal 110A is still high. Thus, between the time that clock signal 110B falls and the time when clock signal 110A falls (between numbers 4 and 5 of FIG. 5), outputs O and O' are in the state as they would be in if clock signal 110A transitioned up while clock signal 110B was still low. Similarly, a glitch in output O' may be produced when clock signal 110A rises before clocks signal 110B and then also falls before clock signal 110B falls, as illustrated between numbers 5 and 6 of FIG. 5. However, the asynchronous state machine described above as part of the phase detector 200 circuitry illustrated in FIG. 4A may suppress the glitches produced on the falling edges of the clock signals by staying closed until both clock signals 110A and 110B have fallen and thus forced outputs O and O' high.

Figure 6:
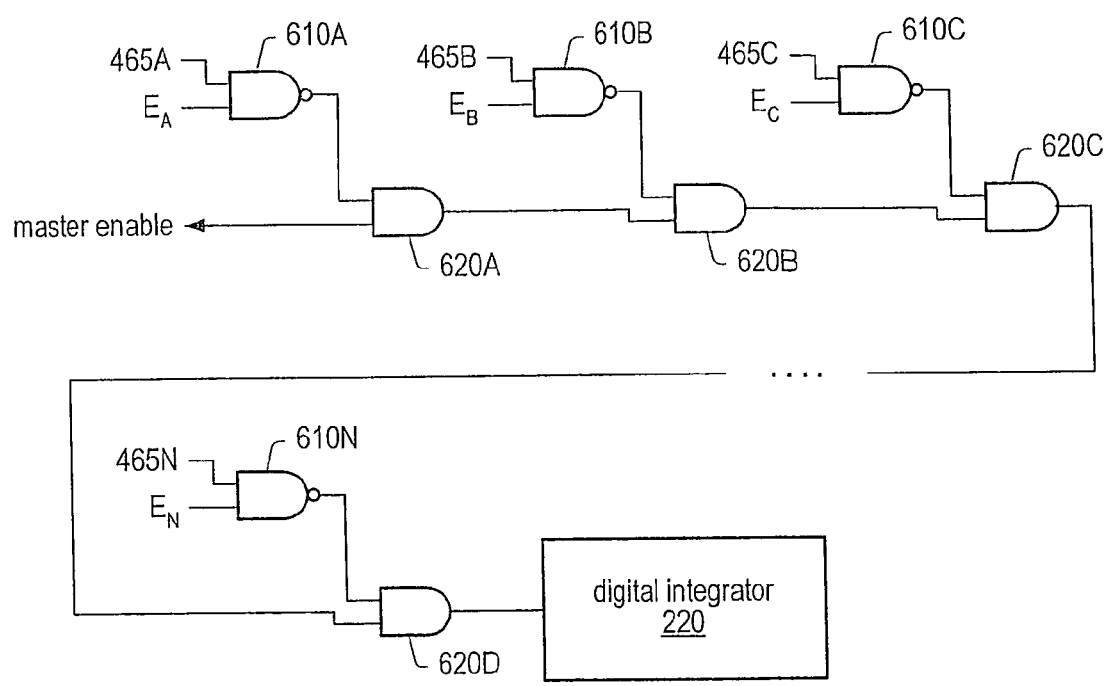
FIG. 6 illustrates one embodiment of logic circuitry for allowing a single digital integrator to independently measure clock skew between various pairs of clock signals of an integrated circuit.

FIG. 6 is a block diagram illustrating one arrangement of logic circuitry allowing a single digital integrator 220 to selectively detect and measure skew between various pairs of clock signals of an integrated circuit, according to one embodiment. As illustrated in FIG. 6, multiple NAND elements 610A-610N may be connected to the respective output signals 465A-465N from a number of phase detectors 220, as described above. Additionally, each NAND element 610 takes as input an enable signal $E_A$-$E_C$. The output from each NAND element 610 is integrated via a series of AND elements 620A-620N, thus allowing digital integrator to selectively enable any of the NAND elements 610, according to some embodiments. In some embodiments, digital integrator 220 or delay controller 120 may be configured to selectively enable a single NAND element 610, thus allowing the respective output signal 465 from the respective upstream phase detector 200 to reach digital integrator for skew detection and measurement, as described above. Additionally, in one embodiment digital integrator may, by enabling or disabling the master enable signal, enable or disable the entire series of outputs from the various phase detectors 200, such as for initialization purposes, etc. In some embodiments, the individual enable signals $E_A$-$E_N$ may enable the signal pathway to allow digital integrator 220 to receive the output signal from one of the phase detectors 200. In other embodiments, enable signals $E_A$-$E_N$ may enable and disable the execution of the respective phase detector.

Thus, in some embodiments, digital integrator 220 may be configured to first enable only NAND element 610A in order to determine and measure any skew present between two clock signals, the relative phase of which is represented by output signal 465A from a respective phase detector 200. After measuring and compensating for any skew measured from that particular phase detector 200, digital integrator 220 may be configured to disable NAND element 610A and enable NAND element 610B in order to measure and compensate for skew between another pair of clock signal. Thus, in some embodiments, digital integrator 220 may be configured to enable each NAND element 610 in turn in order to measure and correct skew between various pairs of clock signals, as described above.

Thus, the digital integrator may be configured to count the number of times one clock signal leads the other, as determined by a phase detector, such as phase detector 200, described above. Thus, in some embodiments, multiple phase detectors 200 may be located at various points in the integrated circuit between a clock distribution network and the clock elements ultimately receiving the clock signals. Additionally, in some embodiments, the digital integrator 220, or some other control circuitry, may be configured to individually enable and disable the output from each of the phase detectors, thereby allowing a single digital integrator to measure the amount of skew between any of the pairs of clock signals analyzed by any individual phase detector. In some embodiments, an integrated circuit may include only a single digital integrator 220, while in other embodiments multiple digital integrators may be included in order to analyze multiple pairs of clock signals simultaneously. Thus, the number of digital integrators included in an integrated circuit may vary from embodiment to embodiment. As described above, the digital integrator 220 may be configured to count, over a specified number of clock cycles, the number of times, as determined by a phase detector, one clock signal leads another. For example, the output of each phase detector 200 may, in some embodiments, be a signal that represents an edge-coded version of whether one signal leads another. As noted above, the output signal from phase detector 200 may go low whenever a first signal leads another signal. Thus, digital integrator 220 may be configured to count the falling edges of the output from a phase detector 200 when determining skew between two clock signals analyzed by phase detector 200. In other embodiments, the output of phase detector 200 may go high when one clock signal leads the other. Whether or not the output of phase detector 200 may go high or low when one clock signal leads the other may vary from embodiment to embodiment and thus, whether a digital integrator counts a falling edge or a rising edge of the output signal when counting the number of times one signal leads the other may also vary accordingly, in various embodiments.

For instance, digital integrator 220 may be configured to count the number of times a first clock signal leads another clock signal over a large number of clock cycles, such as 10000, according to some embodiments. The exact number of clock cycles over which digital integrator 220 counts the number of times one clock signal leads another may vary from embodiment to embodiment. Additionally, the number of clock cycles over which a digital integrator counts clock skew may be adjusted dynamically, such as via software or firmware, or in some embodiments, via a debugging (JTAG) interface to the integrated circuit.

A digital integrator may also include a watchdog timer to aid in counting the number of times one clock signal leads another over a specified number of clock cycles. For example, a watchdog timer may implement an 11-bit counter in order to count out 1024 cycles. Thus, when using an 11-bit counter the most significant bit (MSB) of the counter may transition from 0 to 1 after 1024 cycles. In other embodiments, much larger counters, such as ones configured to count 10000 or more cycles, may be utilized with digital integrator 220 in order to provide a better measurement of skew between pairs of clock cycles.

Additionally, in some embodiments, a digital integrator may be configured to measure and characterize clock jitter among the clock signals. For example, after determining and correcting for any skew between a pair of clock signals, as described above, (whether skew is corrected once, or dynamically), the digital integrator may also be configured to detect, measure, and/or characterize any jitter in the clock signals based on the output from the phase detector(s).

Please note that the logic circuitry illustrated in FIG. 6 represents only one possible embodiment for allowing digital integrator 220 to selectively measure and correct skew for various pairs of clock signals. In other embodiments, other logic configurations, elements and/or designs may be utilized as part of detecting, measuring and correcting skew in an integrated circuit.

Figure 7:
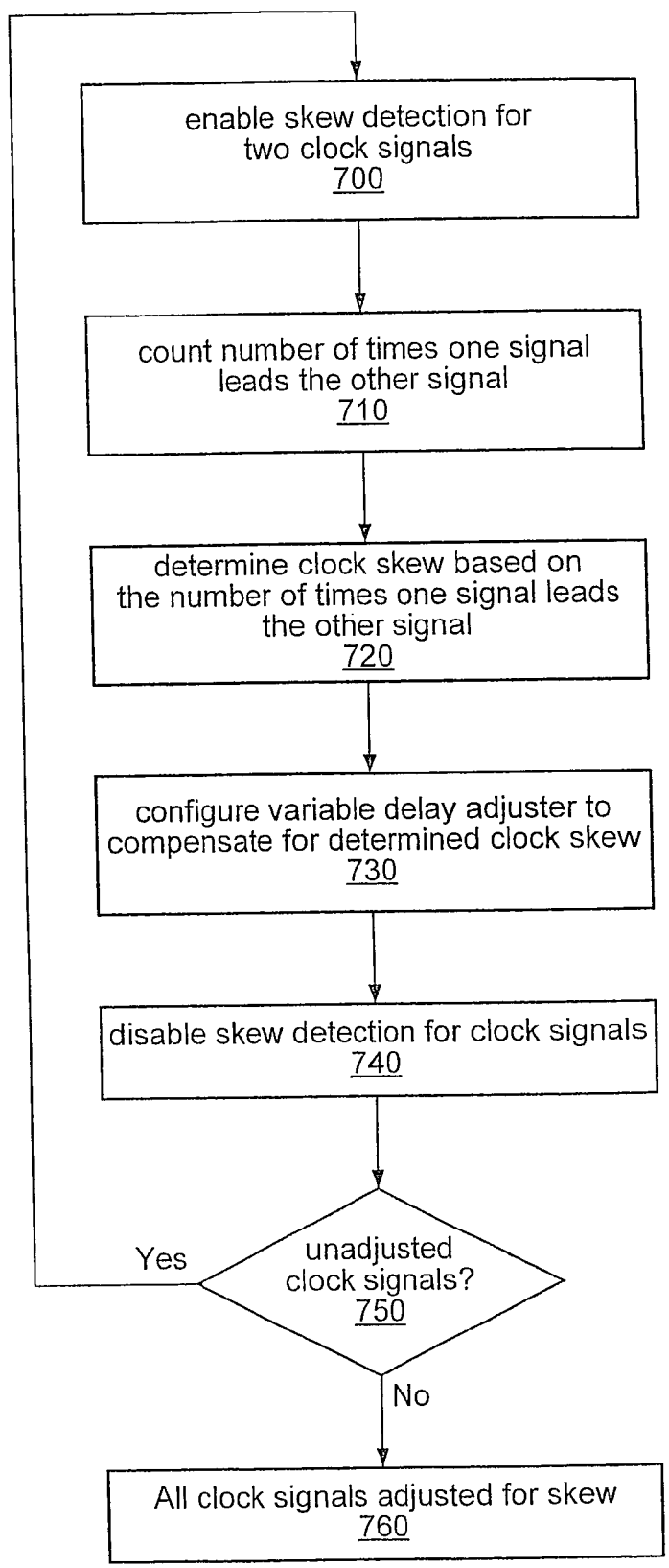
FIG. 7 is a flowchart illustrating one embodiment of a method for measuring clock skew between various pairs of clock signals as described herein.

FIG. 7 is a flowchart illustrating one embodiment of a method for measuring clock skew between various pairs of clock signals, as described herein. As noted above regarding FIG. 6, in some embodiments, multiple phase detectors 200 may be individually selected or enabled in order to count the number of times one clock signal leads another as part of measure skew between the two clock signals. Thus, the delay controller 120, described above, may enable skew detection for two clock signals, as indicated by block 700. For example, the respective output from each of a number of phase detectors 200 may be individually selected so that delay controller 120 may measure the amount of clock skew existing between two selected clock signals. In one embodiment, delay controller 120 may use a number of enable signals, such as $E_A$-$E_N$ of FIG. 6, to select which clock signals to analyze.

As described previously, delay controller 120 may be configured to count, based on the output signal from phase detector 200, the number of times one clock signal, such as clock signal 110A leads another clock signal, such as clock signal 110B, as illustrated by block 710. In some embodiments, the number of times one clock signal leads another may be used to generate an indication of an amount of skew between the two clock signals, as indicated by block 720. As noted above, if one clock signal leads the other more than 50 percent of the time (e.g. 7000 out of 10000 clock cycles) an amount of clock skew exists between the two signals, according to one embodiment. As illustrated by block 730, delay controller 120 may also be configured to configure one or more variable delay adjusters to compensate for the determined amount of clock skew between the two clock signals. In some embodiments, delay controller 120 may configure a single variable delay adjuster to retard or advance the leading edge of one of the clock signals to compensate for the measured clock skew. Additionally, delay controller 120 may be configured to configure more than one variable delay adjuster. For example, delay controller 120 may configure one variable delay adjuster to retard the leading edge of one clock signal and also configure another variable delay adjuster to advance the leading edge of the other clock signal. As noted above, in some embodiments, delay controller 120 may be configured to take advantage of the cyclic nature of the clock signals and advance, rather than retard, the leading edge of the leading clock signal.

When measuring and adjusting the duty cycle of the clock signals, delay controller 120 may be configured to advance or retard both the leading and following edge of a clock signal to compensate for a measured error in duty cycle for the signal.

After compensating for the measured skew between two clock signals, as described above, delay controller 120 may disable the skew detection for those two clock signals, as indicated by block 740. For example, delay controller 120 may use the enable signals E to disable the output from the respective phase detector, as described above. Additionally, before disabling skew detection for the two clock signals, in some embodiments, delay controller 120 may be configured to verify that the configuration of the variable delay adjuster (s) properly compensated for the amount of skew measured between the two clock signals. Thus, as described above, delay controller 120 may, after configuring one or more variable delay adjusters, repeat the measurement of skew between the two signals to verify that the new configuration of the variable delay adjuster(s) properly compensated for the amount of skew. If delay controller 120 determines that additional or less compensation is required, delay controller 120 may reconfigure the variable delay adjuster(s) accordingly. After determining that the configuration of the variable delay adjuster(s) properly compensates for the measured skew between the two clock signals, delay controller 120 may then disable skew detection for the two clock signals, as indicated by block 740.

In some embodiments, delay controller 120 may then determine whether there are additional clock signals for which skew has not been measured, as indicated by decision block 750. If, as illustrated by the positive output of block 750, there are additional clock signals for which skew has not been measured, digital integrator may enable skew detection for two additional clock signals, as illustrated by block 700 and may proceed to measure the amount of skew between the two clock signals and to compensate for the measured skew by configuring one or more variable delay adjusters, as described above. If, however, delay controller 120 determines that skew has been measured (and compensated for) between all pairs of clock signals, as indicated by the negative output of block 750, delay controller 120 may determine that all clock signals have been adjusted to compensate for skew, as illustrated by block 760.

In some embodiments, after determining that skew has been measured (and compensated for) between all pairs of clock signals, delay controller 120 may be configured to start over and repeat the measurement and compensation for skew between the pairs of clock signals again. Thus, in some embodiments, delay controller 120 may be configured to continually measure and compensate for skew between clock signals. In other embodiments, however, skew measurement and compensation may be performed only once, such as to support a test engineer's efforts or as part of an initial setup and configuration effort.

Figure 8A:
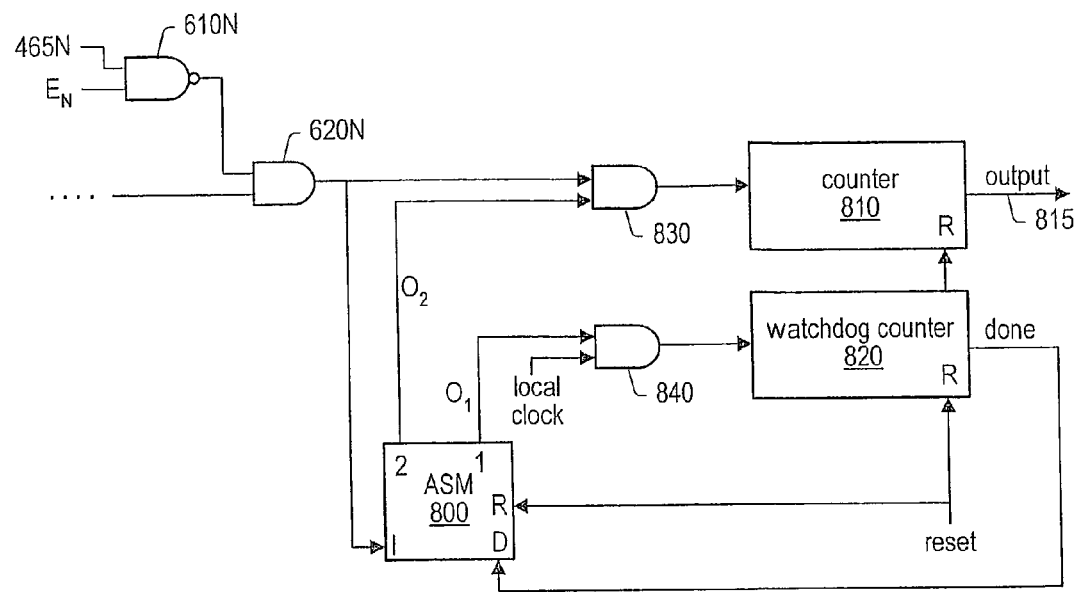
FIG. 8A illustrates one embodiment of a digital integrator and counter for determining, measuring and correcting clock skew in an integrated circuit.

FIG. 8A is a block diagram illustrating one possible implementation of a digital integrator, such as digital integrator 220, according to one embodiment. As described above, a digital integrator may be configured to count the number of times one clock signal leads another in order to measure the amount of skew between the two clock signals. In one embodiment, digital integrator 220 may include counter 810, watchdog counter 820 and an asynchronous state machine (ASM) 800, or other logic circuitry, configured to drive the counting of how many times one clock signal leads another, as output from phase detector 200, described above. Counter 810 may be a digital counter configured to increment based on the output of AND element 830, which combines the output from the respective enabled phase detector 200 and the output 2 from the ASM 800.

Additionally, digital integrator may include a watchdog counter 820 configured to count clock cycles, thereby enabling digital integrator to count the number of times one clock signal leads another across a large number of clock cycles. For example, watchdog counter 820 may be configured to increment to 1024, such as by using 10 bits, according to one embodiment. However in other embodiments, much larger numbers of clock cycles may be counted by watchdog counter 820, such as by using 20 or more bits. As watchdog counters are well understood in the art, the internal workings of watchdog counter 820 will not be discussed in detail herein. Watchdog counter 820 may be configured to output a done signal when ever it counts a predefined number of clock cycles. The done signal may be input into ASM 800 in order to allow ASM 800 to complete the counting of how many times one clock signal leads another and to initialize digital integrator 220 for another measurement cycle.

ASM 800 may be configured to transition or cycle output 1 with every clock cycle, according to some embodiments. Additionally, the output 1 from ASM 800 may be combined, such as via AND element 840, with a local clock to ensure proper clock cycle counting. ASM 800 may also be configured to output 2 indicating when one clock signal leads the other clock signal, thus indicating that counter 810 should increment, according to one embodiment. While FIG. 7A illustrates AND elements 830 and 840 as separate from ASM 800, in some embodiments, these elements may be included as part of ASM 700.

Figure 8B:
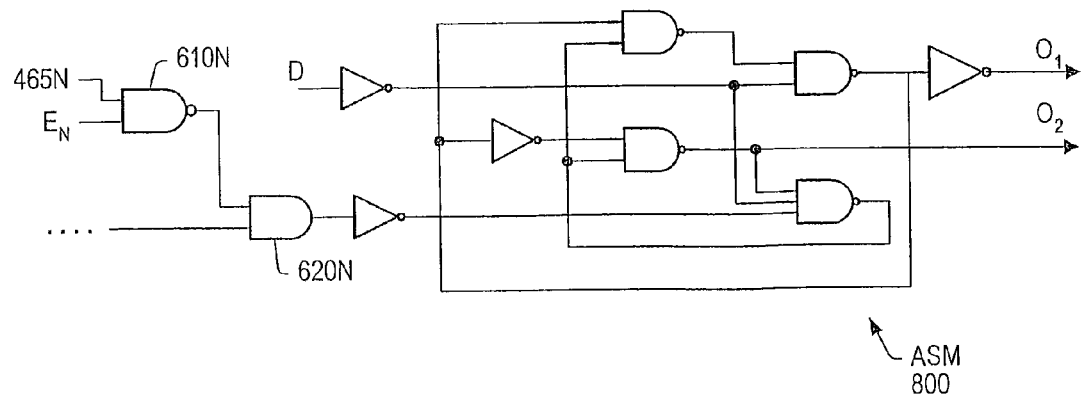
FIG. 8B illustrates one embodiment of an asynchronous state machine as part of a digital integrator and counter for determining, measuring and correcting clock skew in an integrated circuit.

FIG. 8B illustrates one embodiment of logic circuitry for an asynchronous state machine (ASM) 800, described above as part of digital integrator 220. The logic circuitry illustrated in FIG. 8B takes two main inputs, namely signal D, which in some embodiments, represents the done output from the watchdog counter 820, described above, and the output from an enabled phase detector 200. The ASM 800 may then use those two input signals to generate two output signals. For example, ASM 800 may, in some embodiments, use the input signal D (done) to ensure that the overall system stops measuring skew after counting a predetermined number of clock cycles. Thus, in some embodiments ASM 800 may generate two output signals. For instance, ASM 800 may generate output $O_1$, which, when combined with a local clock, as illustrated in FIG. 8A, allows watchdog counter 820 to count a specified number of clock cycles. In one embodiment, a done signal, D, may be output from the watchdog counter 820 and input to the logic circuitry of ASM 800 and may indicate when the specified number of clock cycles have been counted and thus when to stop generating the output signals, $O_1$ and $O_2$. ASM 820 also generates output $O_2$ that indicates each time the output signal 465 from an enabled phase detector 200 transitions low, and thus indicates when one of the clock signals analyzed by the phase detector 200 leads another clock signal.

Thus, as described above regarding FIG. 8A, ASM 800 may generate two counter signals, one used to count the number of clock cycles elapsing and the other used to count the number of times one clock signal leads the other clock signal. Please note that the specific logic circuitry illustrated in FIG. 8B represents only one exemplary embodiment of logic circuitry for ASM 800. Other embodiments may implement ASM 800 in different ways and/or using different types and numbers of logical components. In general any method for counting both clock cycles and the number of times one clock signal leads another may be utilized as part of detecting measuring and correct clock skew in an integrated circuit, as described herein.

Figure 9:
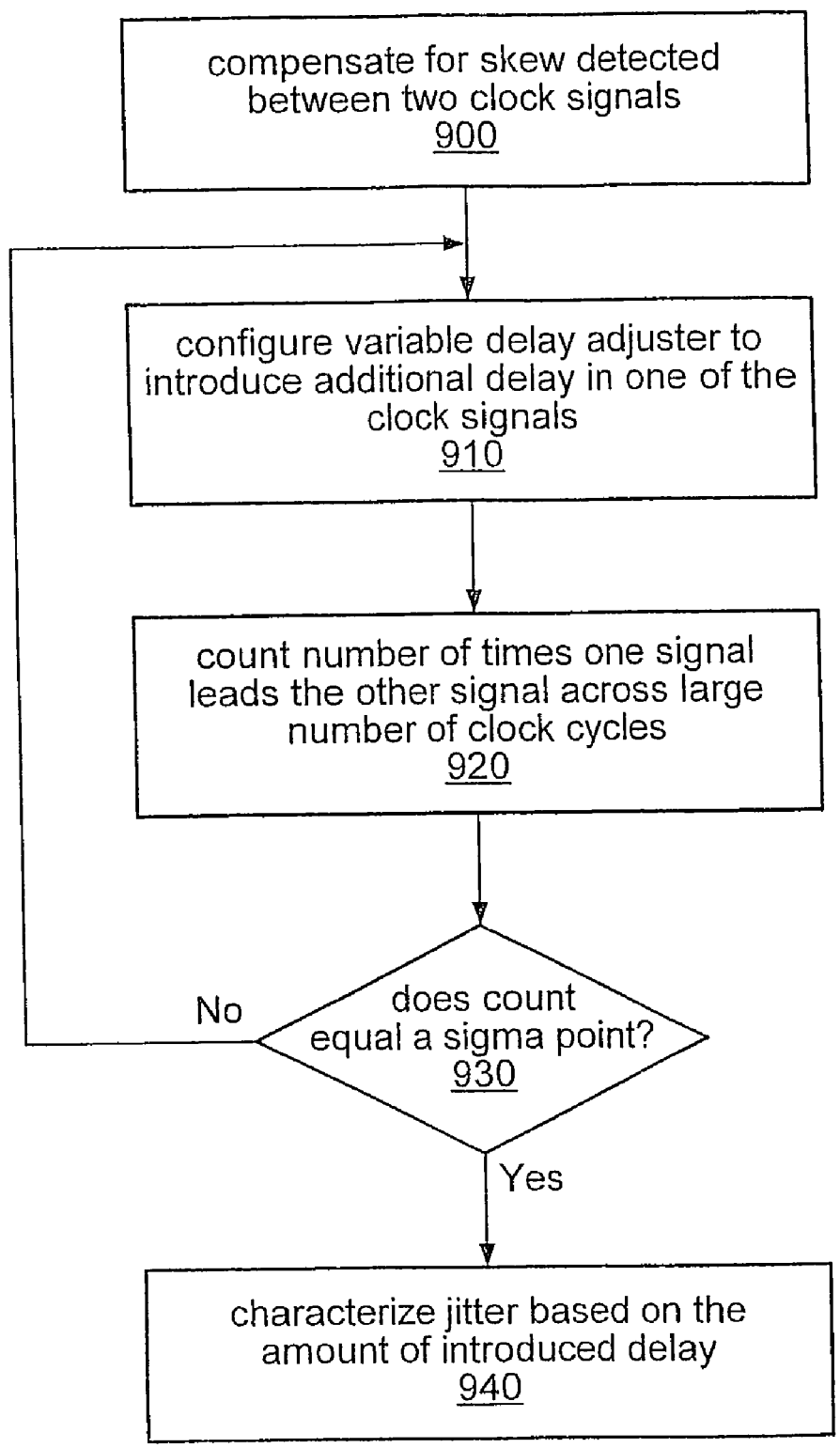
FIG. 9 is a flowchart illustrating one embodiment of a method for measuring jitter between two clock signals, as described herein.

As noted above, a delay controller, such as delay controller 120 may be configured to measure and/or characterize the amount of jitter present between two clock signals, according to some embodiments. FIG. 9 is a flowchart illustrating one embodiment of a method for characterizing the amount of jitter present between two clock signals. In one embodiment, delay controller 120 may first compensate for any skew detected between two clock signals, such as clock signals 110A and 110B, as indicated by block 900. By first de-skewing the two clock signals, delay controller 120 may be able to more accurately characterize any jitter present in the system. As noted above, after configuring one or more variable delay adjusters to de-skew two clock signals, the number of times one of the signals leads the other over a large number of clock cycles should approach 50%. In other words, with no skew present between the two signals, jitter should cause clock signal 110A to lead clock signal 110B about as many times as clock signal 110B leads clock signal 110A. By introducing additional delay into one of the clock signals, say clock signal 110A, delay controller 120 may map out the probability distribution function of the jitter present between the two signals. For example, after introducing a delay equivalent to 1-sigma of the magnitude of the jitter into clock signal 110A, the number of times clock signal 110A leads clock signal 110B should shift from 50% to approximately 66%, or the equivalent of 1-sigma in the probability distribution function of the jitter.

However, since delay controller 120 may be configured to measure and/or characterize the amount of jitter, delay controller 120 may be configured to repeatedly introduce a small additional amount of delay into one of the clock signals and to count the number of times that signal leads the other after each introduced delay until the delayed signal leads the other signal approximately 66% of the time. Thus, the total amount of delay introduced (after compensating for any clock skew) may represent 1-sigma of the distribution function of the jitter. For example, if it took an extra delay of 10 picoseconds to clock signal 110A to result in clock signal 110A leading clock signal 110B 66% of the time, 10 picoseconds may represent 1-sigma of the distribution function of the jitter.

Thus, delay controller 120 may be configured to configure one or more variable delay adjusters to introduce additional delay into one of the clock signals, as illustrated by block 910 and to count the number of times the delayed signal leads the other over a large number of clock cycles, as indicated by block 920. If the number of times the delayed signal leads the other signal does not represent a sigma point of the jitter (e.g. if the delayed clock signal does not lead the other approximately 66% of the time for a 1 sigma point), as indicated by the negative output of block 930, delay controller 120 may be configured to introduced additional delay to the relevant clock signal. In some embodiments, delay controller 120 may be configured to repeatedly introduce small extra amounts of delay and to count the number of times the delayed signal leads the other until delay controller 120 has reached a delay representative of a 1, 2, or larger sigma of the distribution function of the jitter.

Once delay controller 120 has introduced sufficient delay to result in the delayed signal leading the other signal a number of times that corresponds to a 1 (or 2 or larger) sigma of the distribution function of the jitter, as illustrated by the positive output from block 930, delay controller 120 may be configured to characterize the jitter based on the amount of introduced delay. For example, as noted above, it a 10 picosecond delay results in one signal leading the other signal 66% of the time, 10 picoseconds may be considered to represent 1 sigma of the distribution function of the jitter.

In some embodiments, delay controller 120 may be configured to characterize jitter based on introducing a delay corresponding to 1-sigma of the distribution function of the jitter (as in block 940). In other embodiments, however, delay controller 120 may be configured to also measure the amount of delay that corresponds to additional sigma points of the distribution function. For instance, delay controller 120 may be configured to discover, such as by repeatedly introducing additional delay and counting the number of times the delayed signal leads the other, the amount of delay that corresponds to 2, 3 or larger sigma points of the distribution function of the jitter. For example, the amount of delay required to make clock signal 110A lead clock signal 110B 95% of the time, the total amount of introduced delay (not counting any delay introduced to de-skew the signals) may be considered to represent 2 sigma of the jitter's distribution function. Similarly, the amount of extra delay required to make clock signal 110A lead clock signal 110B 99.3% of the time corresponds to 3 sigma of the jitter distribution function.

Thus, by configuring variable delay adjusters to introduce additional delay, delay controller 120 may characterize the amount of jitter present for the two clock signals. In some embodiments, delay controller 120 may be configured to use the same variable delay adjusters to compensate for clock skew and to characterize jitter. In other embodiments, however, additional variable delay adjusters may be included in an integrated circuit specifically for characterizing jitter as opposed to compensating for clock skew.

Figure 10:
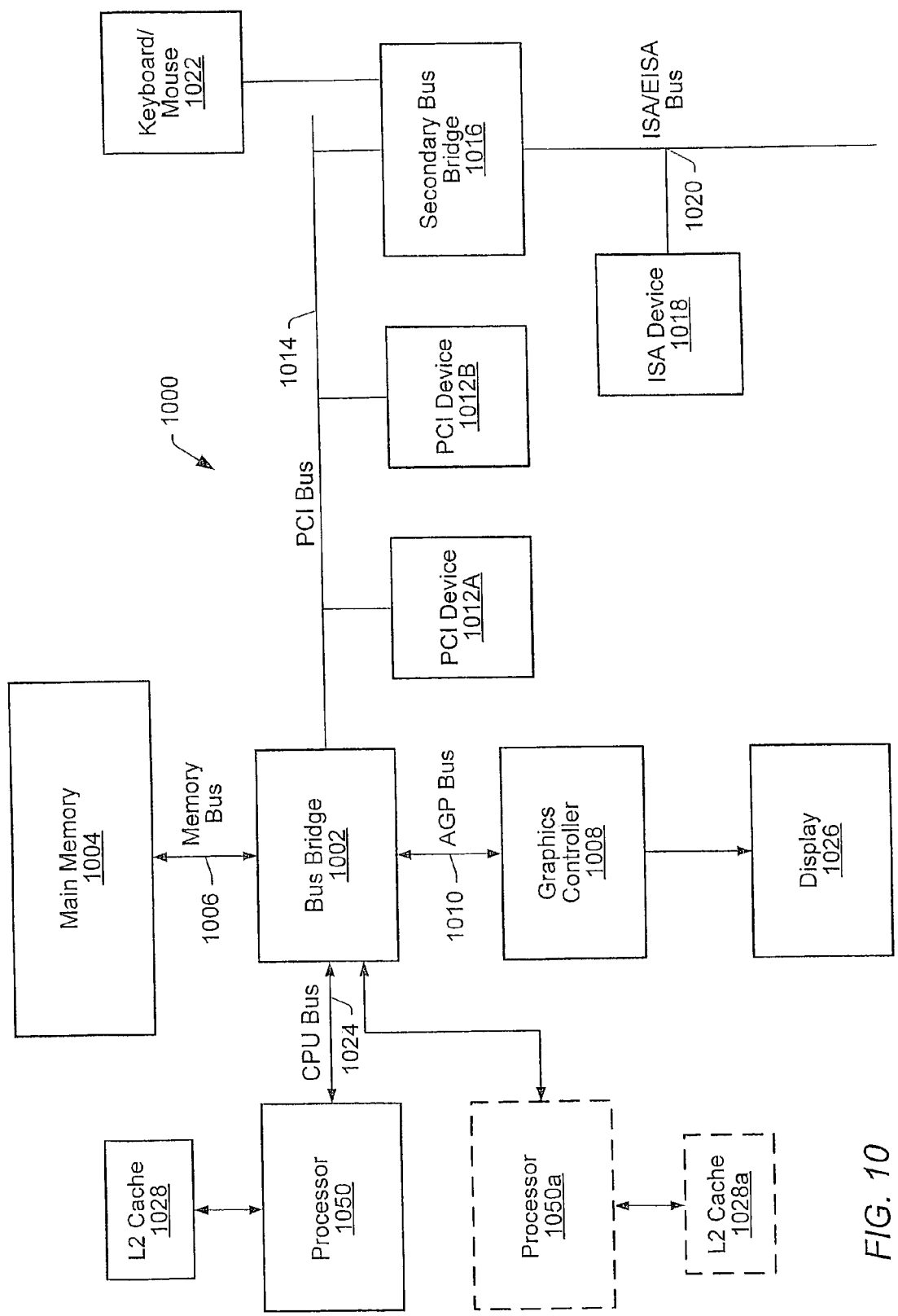
FIG. 10 shows a block diagram of one embodiment of an exemplary computer system suitable for implementing measuring and compensating for skew, duty cycle and jitter in clock signals of an integrated circuit.

FIG. 10 shows a block diagram of one embodiment of a computer system 1000 that includes a microprocessor 1050 coupled to a variety of system components through a bus bridge 1002. Microprocessor 1050 may include an embodiment of a delay controller, such as delay controller 120, including phase detectors, variable delay adjusters, and a digital integrator and counters, as described above. FIG. 10 illustrates one exemplary embodiment of a computer system. However, other embodiments of a computer system are possible and contemplated. In the depicted system, a main memory 1004 is coupled to bus bridge 1002 through a memory bus 1006, and a graphics controller 1008 is coupled to bus bridge 1002 through an AGP bus 1010. Several PCI devices 1011A-1011B are coupled to bus bridge 1002 through a PCI bus 1014. A secondary bus bridge 1016 may also be provided to accommodate an electrical interface to one or more EISA or ISA devices 1018 through an EISA/ISA bus 1020. In this example, microprocessor 1050 is coupled to bus bridge 1002 through a CPU bus 1024 and to an optional L2 cache 1028. In some embodiments, the microprocessor 100 may include an integrated L1 cache (not shown).

Bus bridge 1002 provides an interface between microprocessor 1050, main memory 1004, graphics controller 1008, and devices attached to PCI bus 1014. When an operation is received from one of the devices connected to bus bridge 1002, bus bridge 1002 identifies the target of the operation (e.g., a particular device or, in the case of PCI bus 1014, that the target is on PCI bus 1014). Bus bridge 1002 routes the operation to the targeted device. Bus bridge 1002 generally translates an operation from the protocol used by the source device or bus to the protocol used by the target device or bus.

In addition to providing an interface to an ISA/EISA bus for PCI bus 1014, secondary bus bridge 1016 may incorporate additional functionality. An input/output controller (not shown), either external from or integrated with secondary bus bridge 1016, may also be included within computer system 1000 to provide operational support for a keyboard and mouse 1022 and for various serial and parallel ports. An external cache unit (not shown) may also be coupled to CPU bus 1024 between microprocessor 1050 and bus bridge 1002 in other embodiments. Alternatively, the external cache may be coupled to bus bridge 1002 and cache control logic for the external cache may be integrated into bus bridge 1002. L2 cache 1028 is shown in a backside configuration to microprocessor 1050. It is noted that L2 cache 1028 may be separate from microprocessor 1050, integrated into a cartridge (e.g., slot 1 or slot A) with the microprocessor, or even integrated onto a semiconductor substrate with the microprocessor.

Main memory 1004 is a memory in which application programs are stored and from which microprocessor 1050 primarily executes. A suitable main memory 1004 may include DRAM (Dynamic Random Access Memory). For example, a plurality of banks of SDRAM (Synchronous DRAM) or Rambus DRAM (RDRAM) may be suitable.

PCI devices 1011A-1011B are illustrative of a variety of peripheral devices such as network interface cards, video accelerators, audio cards, hard or floppy disk drives or drive controllers, SCSI (Small Computer Systems Interface) adapters and telephony cards. Similarly, ISA device, 1018 is illustrative of various types of peripheral devices, such as a modem, a sound card, and a variety of data acquisition cards such as GPIB or field bus interface cards.

Graphics controller 1008 is provided to control the rendering of text and images on a display 1026. Graphics controller 1008 may embody a typical graphics accelerator generally known in the art to render three-dimensional data structures that can be effectively shifted into and from main memory 1004. Graphics controller 1008 may therefore be a master of AGP bus 1010 in that it can request and receive access to a target interface within bus bridge 1002 to thereby obtain access to main memory 1004. A dedicated graphics bus accommodates rapid retrieval of data from main memory 1004. For certain operations, graphics controller 1008 may further be configured to generate PCI protocol transactions on AGP bus 1010. The AGP interface of bus bridge 1002 may thus include functionality to support both AGP protocol transactions as well as PCI protocol target and initiator transactions. Display 1026 is any electronic display upon which an image or text can be presented. A suitable display 1026 includes a cathode ray tube ("CRT"), a liquid crystal display ("LCD"), etc.

It is noted that, while the AGP, PCI, and ISA or EISA buses have been used as examples in the above description, any bus architectures may be substituted as desired.

It is further noted that computer system 1000 may be a multiprocessing computer system including additional microprocessors (e.g., microprocessor 1050a shown as an optional component of computer system 1000). Microprocessor 1050a may be similar to microprocessor 1050. More particularly, microprocessor 1050a may be an identical copy of microprocessor 1050 in one embodiment. Microprocessor 1050a may be connected to bus bridge 1002 via an independent bus or may share CPU bus 1024 with microprocessor 1050. Furthermore, microprocessor 100a may be coupled to an optional L2 cache 1028a similar to L2 cache 1028.

Various components illustrated in FIG. 10 may, according to different embodiments, include logic circuitry configured to implement detecting and compensating for clock skew, correcting duty cycle errors, and/or characterizing signal jitter, as described herein. For example, processor 1050 may include a delay controller including variable delay adjusters, phase detectors, and counters, configured to measure and compensate for clock skew, correct duty cycle errors and/or characterize signal jitter, in various embodiments. Similarly, other components of the computer system illustrated in FIG. 10, such as bus bridge 1002, graphics controller 1008, and secondary bus bridge 1010, among others, may also include logic circuitry configured to implement detecting and compensating for clock skew, correcting duty cycle errors, and/or characterizing signal jitter, as described herein. Different components may implement different portions of the functionality described herein. For example, bus bridge 1002 may include a delay controller configured to measure and compensate for clock skew, while graphic controller 1008 may include a delay controller configured to correct duty cycle errors, according to different embodiments. In general, any combination (and/or multiple combinations) of detecting and compensating for clock skew, correcting duty cycle errors, and/or characterizing signal jitter may be implemented, according to certain embodiments.

Please note that, as used herein, the terms "clock cycle" or "cycle" refer to an interval of time in which the various stages of the instruction processing pipelines complete their tasks. Instructions and computed values are captured by memory elements (such as registers or arrays) according to a clock signal defining the clock cycle. For example, a memory element may capture a value according to the rising or falling edge of the clock signal.

Numerous variations and modifications will become apparent to those skilled in the art once the above disclosure is fully appreciated. It is intended that the following claims be interpreted to embrace all such variations and modifications.

What is claimed is:

1. An integrated circuit, comprising:
   a plurality of clocked elements, wherein operation of the clocked elements is synchronized by a clock signal comprising a rising edge and a falling edge;
   a clock distribution network coupled to the plurality of clocked elements, wherein the clock distribution network is configured to provide a plurality of consumer clock signals;
   a plurality of variable delay elements coupled between the clock distribution network and the plurality of clocked elements, wherein each of the variable delay elements is configured to delay the rising edge and/or the falling edge of one of the plurality of consumer clock signals;
   a delay element controller configured to:
      for each of a plurality of respective pairs of the plurality of consumer clock signals:
         determine skew between the respective pair of consumer clock signals; and
         adjust one or more of the plurality of variable delay elements to minimize skew between the respective pair of consumer clock signals.

2. The integrated circuit as recited in claim 1, wherein the delay element controller is configured to determine skew between outputs of delay elements.

3. The integrated circuit as recited in claim 1, wherein to adjust one of the plurality of delay elements, the delay element controller is configured to delay a rising edge of one of the pair of consumer clock signals.

4. The integrated circuit as recited in claim 1, wherein each of the plurality of variable delay elements is configured to delay the rising edge and the falling edge of respective ones of the plurality of consumer clock signals independently from one another.

5. The integrated circuit as recited in claim 1, wherein the delay element controller is further configured to determine a difference in duty cycle between two of the plurality of consumer clock signals.

6. The integrated circuit as recited in claim 5, wherein the delay element controller is further configured to adjust one or more of the plurality of variable delay elements to compensate for the determined difference in duty cycle.

7. A method, comprising:
   receiving a plurality of clock signals;
   determining an amount of skew between a pair of the plurality of clock signals; and
   delaying at least one of the pair of clock signals to reduce skew between the pair of clock signals, wherein said delaying is performed after initial distribution and before final distribution of clock signals in a clock distribution network configured to distribute the plurality of clock signals to a plurality of clock elements, and wherein said delaying is performed by one or more incrementally adjustable delay elements.

8. The method of claim 7, further comprising repeating said receiving, said determining, and said delaying for additional respective pairs of the plurality of clock signals.

9. The method of claim 7, further comprising determining a difference in duty cycle between the pair of clock signals.

10. The method of claim 9, further comprising adjusting the one or more delay elements to compensate for the determined difference in duty cycle.

11. The method of claim 7, wherein said delaying comprising delaying a rising edge of one of the pair clock signals.

12. An computer system, comprising:
   a system memory, and
   one or more processors coupled to the system memory, wherein at least one of the one or more processors comprises:
      a plurality of clocked elements, wherein operation of the clocked elements is synchronized by a clock signal comprising a rising edge and a falling edge;
      a clock distribution network coupled to the plurality of clocked elements, wherein the clock distribution network is configured to provide a plurality of consumer clock signals;
      a plurality of variable delay elements coupled between the clock distribution network and the plurality of clocked elements, wherein each of the variable delay elements is configured to delay the rising edge and/or the falling edge of one of the plurality of consumer clock signals;
      a delay element controller configured to:
         for at least one respective pair of the plurality of the consumer clock signals:
            determine skew between the pair of the clock signals; and
            delay at least one of the pair to reduce skew between the pair of clock signals, wherein to delay at least one of the pair the delay element controller is configured to adjust at least one of the plurality of delay elements.

13. The computer system as recited in claim 12, wherein the delay element controller is configured to determine skew between outputs of the variable delay elements.

14. The integrated circuit as recited in claim 12, wherein to adjust the at least one of the plurality of delay elements, the delay element controller is configured to delay a rising edge of one of the respective pair of consumer clock signals.

15. The integrated circuit as recited in claim 12, wherein each of the plurality of variable delay elements is configured to delay the rising edge and the falling edge of respective ones of the plurality of consumer clock signals independently from one another.

16. The integrated circuit as recited in claim 12, wherein the delay element controller is further configured to determine a difference in duty cycle between two of the plurality of consumer clock signals.

17. The integrated circuit as recited in claim 16, wherein the delay element controller is further configured to adjust one or more of the plurality of variable delay elements to compensate for the determined different in duty cycle.

* * * * *